(12) United States Patent
Zhu et al.

(10) Patent No.: US 11,713,395 B2
(45) Date of Patent: Aug. 1, 2023

(54) RESIN MATERIALS FOR MAKING THREE-DIMENSIONAL OBJECTS AND METHODS OF USING THE SAME

(71) Applicant: LUXCREO (BEIJING) INC., Beijing (CN)

(72) Inventors: Guang Zhu, Ningbo (CN); Yisi Lu, Ningbo (CN); Jie Gao, Ningbo (CN); Le Lv, Ningbo (CN)

(73) Assignee: LUXCREO (BEIJING) INC., Beijing (CN)

( * ) Notice: Subject to any disclaimer, the term of this patent is extended or adjusted under 35 U.S.C. 154(b) by 208 days.

(21) Appl. No.: 16/999,137

(22) Filed: Aug. 21, 2020

(65) Prior Publication Data

US 2020/0392332 A1 Dec. 17, 2020

Related U.S. Application Data

(63) Continuation of application No. PCT/CN2020/095715, filed on Jun. 12, 2020.

(Continued)

(51) Int. Cl.
| | |
|---|---|
| *C08L 75/04* | (2006.01) |
| *B29C 64/245* | (2017.01) |
| *B29C 64/188* | (2017.01) |
| *B29C 64/124* | (2017.01) |
| *C08G 8/10* | (2006.01) |

(Continued)

(52) U.S. Cl.
CPC .............. *C08L 75/04* (2013.01); *B29C 64/124* (2017.08); *B29C 64/188* (2017.08); *B29C 64/245* (2017.08); *C08G 8/10* (2013.01); *C08K 5/101* (2013.01); *C08K 5/17* (2013.01);

(Continued)

(58) Field of Classification Search
CPC ..... C08L 75/04; B29C 64/124; B29C 64/188; B29C 64/245; C08K 5/101; C08K 5/17; B33Y 10/00; B33Y 70/00
See application file for complete search history.

(56) References Cited

U.S. PATENT DOCUMENTS

| | | |
|---|---|---|
| 3,639,657 A | 2/1972 | Moran, Jr. et al. |
| 3,932,357 A | 1/1976 | Schmitt et al. |

(Continued)

FOREIGN PATENT DOCUMENTS

| | | |
|---|---|---|
| CN | 106543705 A | 3/2017 |
| CN | 107868441 A | 4/2018 |

(Continued)

OTHER PUBLICATIONS

The Extended European Search Report in European Application No. 20821801.6 dated Jun. 8, 2022, 6 pages.

(Continued)

*Primary Examiner* — Michael M. Robinson
(74) *Attorney, Agent, or Firm* — Metis IP LLC

(57) ABSTRACT

A polymerizable liquid that can be used for producing three-dimensional objects by methods of additive manufacturing is disclosed. The polymerizable liquid may comprise: (a) a blocked or reactively blocked polyurethane prepolymer; (b) (optional) a reactive diluent; (c) a blocked or reactively blocked curing agent; (d) a photoinitiator; and (e) (optional) a blocked or reactively blocked diisocyanate. The method using such polymerizable liquid to form three-dimensional objects is also described.

14 Claims, 4 Drawing Sheets

Related U.S. Application Data

(60) Provisional application No. 62/982,154, filed on Feb. 27, 2020, provisional application No. 62/942,678, filed on Dec. 2, 2019, provisional application No. 62/861,240, filed on Jun. 13, 2019.

(51) Int. Cl.
  *C08K 5/17* (2006.01)
  *C08K 5/20* (2006.01)
  *C08K 5/101* (2006.01)
  *B29C 64/35* (2017.01)
  *B33Y 10/00* (2015.01)
  *B33Y 70/00* (2020.01)

(52) U.S. Cl.
  CPC ............... *C08K 5/20* (2013.01); *B29C 64/35* (2017.08); *B33Y 10/00* (2014.12); *B33Y 70/00* (2014.12)

(56) References Cited

U.S. PATENT DOCUMENTS

| | | |
|---|---|---|
| 4,430,489 A | 2/1984 | Macmillan et al. |
| 5,231,147 A | 7/1993 | Hartman et al. |
| 9,453,142 B2 | 9/2016 | Rolland et al. |
| 9,676,963 B2 | 6/2017 | Rolland et al. |
| 9,982,164 B2 | 5/2018 | Rolland et al. |
| 2006/0293437 A1* | 12/2006 | Ukai ................ C09K 3/10 524/502 |
| 2007/0213497 A1 | 9/2007 | Nagaraj et al. |
| 2010/0092733 A1 | 4/2010 | Blank et al. |
| 2015/0183983 A1 | 7/2015 | Veyland et al. |
| 2015/0259465 A1 | 9/2015 | Burckhardt et al. |
| 2017/0120515 A1 | 5/2017 | Rolland et al. |
| 2017/0173872 A1 | 6/2017 | Mccall et al. |
| 2017/0239887 A1 | 8/2017 | Rolland et al. |
| 2018/0370125 A1* | 12/2018 | Rolland ................ B29C 64/291 |
| 2019/0039311 A1* | 2/2019 | Busbee ................ B33Y 30/00 |
| 2019/0055180 A1 | 2/2019 | Nishida et al. |
| 2020/0070409 A1 | 3/2020 | Poelma |

FOREIGN PATENT DOCUMENTS

| | | |
|---|---|---|
| CN | 109320666 A | 2/2019 |
| KR | 20170010299 A | 1/2017 |
| WO | 9426468 A1 | 11/1994 |
| WO | 2015200173 A1 | 12/2015 |
| WO | 2017112521 A1 | 6/2017 |
| WO | 2019103855 A1 | 5/2019 |

OTHER PUBLICATIONS

International Search Report in PCT/CN2020/095715 dated Sep. 16, 2020, 6 pages.
Written Opinion in PCT/CN2020/095715 dated Sep. 16, 2020, 4 pages.
Sachin Velankar et al., High-Performance UV-Curable Urethane Acrylates Via Deblocking Chemistry, Journal of Applied Polymer Science, 62(9): 1361-1376, 1996.

* cited by examiner

RESIN MATERIALS FOR MAKING THREE-DIMENSIONAL OBJECTS AND METHODS OF USING THE SAME

CROSS-REFERENCE TO RELATED APPLICATION

This application is a continuation of International Application No. PCT/CN 2020/095715, field on Jun. 12, 2020, which claims priority to U.S. Provisional Patent Application No. 62/861,240, filed on Jun. 13, 2019, U.S. Provisional Patent Application No. 62/942,678, filed on Dec. 2, 2019, and U.S. Provisional Patent Application No. 62/982,154, filed on Feb. 27, 2020, the entire contents of each of which are hereby incorporated by reference.

TECHNICAL FIELD

This disclosure relates generally to polymerizable resin materials and methods of using the same for manufacturing three-dimensional objects.

BACKGROUND

Photopolymerization 3D printing technology uses photopolymerizable resins as raw materials, and solidifies such liquid photopolymerizable resins under visible or ultraviolet light irradiation. The photopolymerizable resin is generally in a liquid state, and it undergoes photopolymerization under irradiation of visible or ultraviolet light of a certain wavelength to complete curing. In a typical photopolymerization 3D printing process, the three-dimensional object is built up one layer at a time. Each layer is formed by projecting a two-dimensional pattern for that layer into a photopolymerizable liquid, thus curing the liquid to form a solid shape that matches the two-dimensional pattern. The pattern typically is displayed on a programmable display, such as those based on LCD (liquid crystal display) or DLP (digital light processing, which is based on digital micromirror devices) technologies. The pattern is projected by optics from the display device onto the liquid. Because the display device is programmable, the pattern on the display can be changed for different layers.

In conventional photopolymerization 3D printing process, two type of printing techniques are commonly used, top-down printing and bottom-up printing. In the "top-down" printing, the photopolymerizable resin is cured by a light source placed above the resin reservoir on a build platform where the 3D object is cured and attached to. Once the current layer is cured, the build platform is lowered down into the resin reservoir for the next layer. Each new layer is formed on the upper surface of the 3D object to be formed. By contrast, in the "bottom up" printing, the photopolymerizable resin is cured through a light-transmissive window in the bottom of the resin reservoir by a light source from below. Each new layer is formed on the bottom surface of the 3D object to be formed. In "bottom-up" printing, the build platform is raised out of the resin reservoir and a 'peel' step is required between each layer in order to detach the cured layer from the bottom surface of the resin reservoir. Continuous Liquid Interface Production (CLIP) is one of bottom-up 3D printing techniques where photopolymerizable resin is cured through an oxygen permeable window in the bottom of the resin reservoir by a light source from below. The oxygen layer (called as "dead zone" or "inhibition layer") over the window keeps the liquid resin from sticking to the bottom surface of the resin reservoir and continuous light exposure can be utilized because no 'peel' step is required. However, this type of printing technique also has its limitations. For example, the dead zone is highly temperature sensitive and minor temperature fluctuation may cause the print to fail.

U.S. Pat. No. 9,676,963 disclosed a method of forming a three-dimensional object using a polymerizable liquid comprising a mixture of a first light polymerizable liquid component and a second solidifiable component that is different from the first component. However, such method uses a mixture of at least two different components and the viscosity will significantly increase after the two components are mixed together since some components may solidify prematurely. As a result, the three-dimensional printing process must start within hours of these two components being mixed, otherwise the mixture would become too viscous to use. This requires the separate storage of different components, which increases the complexity of the manufacturing process.

Thus, there is a need for better materials and methods for manufacturing three-dimensional objects using photopolymerizable 3D printing techniques.

SUMMARY

Described herein are methods and materials to produce three-dimensional objects by additive manufacturing. In some embodiments, the materials to produce the three-dimensional object comprises a polymerizable liquid comprising:
(a) a blocked or reactively blocked polyurethane prepolymer;
(b) (optional) a reactive diluent;
(c) a blocked or reactively blocked curing agent;
(d) a photoinitiator; and
(e) (optional) a blocked or reactively blocked diisocyanate.

In some embodiments, the blocked or reactively blocked polyurethane prepolymer comprises a polyisocyanate.

In some embodiments, the blocked or reactively blocked polyurethane prepolymer has the structure of Formula (A):

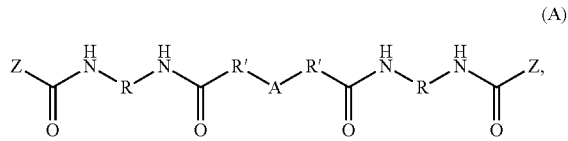

wherein A and R are each independently a hydrocarbyl group, R' is NH or O, and Z is a blocking group having a reactive epoxy, alkene, alkyne, or thiol terminal group.

In some embodiments, the blocking group Z is tert-butyl aminoethyl methacrylate (t-BAEMA).

In some embodiments, the blocked or reactively blocked curing agent of the polymerizable liquid has the structure of Formula (A1), Formula (A2), or Fomula (A3):

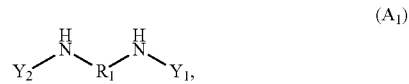

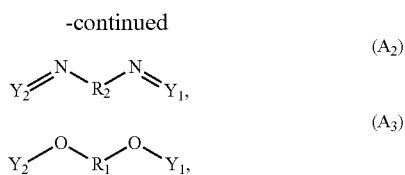

wherein $R_1$, $R_2$, and $R_3$ are each independently a linear or branched C1-C36 alkyl or alkylene, alkenyl or alkenylene, aryl or arylene, heteroaryl or heteroarylene, cycloalkyl or cycloalkenyl moiety; $Y_1$ and $Y_2$ are each independently a protecting group that protects amino groups or hydroxyl groups.

In some embodiments, the protecting groups $Y_1$ and $Y_2$ have different structures.

In some embodiments, the blocked or reactively blocked curing agent comprises an imine group, a substituent derived from reactions of aldehydes or ketones with amines.

In some embodiments, the blocked or reactively blocked curing agent comprises a carbamate group, a substituent derived from reactions of carboxylic acids or carboxylic esters with amines.

In some embodiments, the protecting groups $Y_1$ and/or $Y_2$ further comprise a photopolymerizable group.

In some embodiments, the photopolymerizable groups of $Y_1$ and/or $Y_2$ comprise an acrylate or methacrylate group.

In some embodiments, the blocked or reactively blocked curing agent of the polymerizable liquid has the structure of Formula (A4), Formula (A5), or Formula (A6):

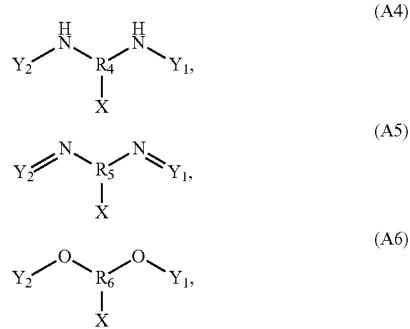

wherein $R_4$, $R_5$, and $R_6$ are each independently aminodialkyl, a C3-C36 aryl or arylene, cycloalkyl or cycloalkenyl moiety; $Y_1$ and $Y_2$ are each independently a protecting group that protects amino groups or hydroxyl groups; and X comprises a photopolymerizable group.

The present invention further provides a method of forming a three-dimensional object, comprising:
(a). providing a printing region defined by a forming platform and a resin reservoir having a forming surface;
(b). filling said printing region with a polymerizable liquid as described elsewhere in the present disclosure;
(c). exposing said printing region to energy to form a solid printing intermediate having substantially the same shape as said three-dimensional object;
(d). (optional) washing said printing intermediate;
(e). heating, microwave irradiating, or using other methods to provide energy to said printing intermediate to form said three-dimensional object.

In some embodiments, the blocked or reactively blocked curing agent used the method is contained in the printing intermediate in a cured or solidified form.

In some embodiments, the formed three-dimensional object comprises a polymer blend, interpenetrating polymer network, semi-interpenetrating polymer network, or sequential interpenetrating polymer network of polyurethane and polyacrylate.

In some embodiments, the formed three-dimensional object comprises a copolymer of polyurethane and polyacrylate.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

Figure 1:
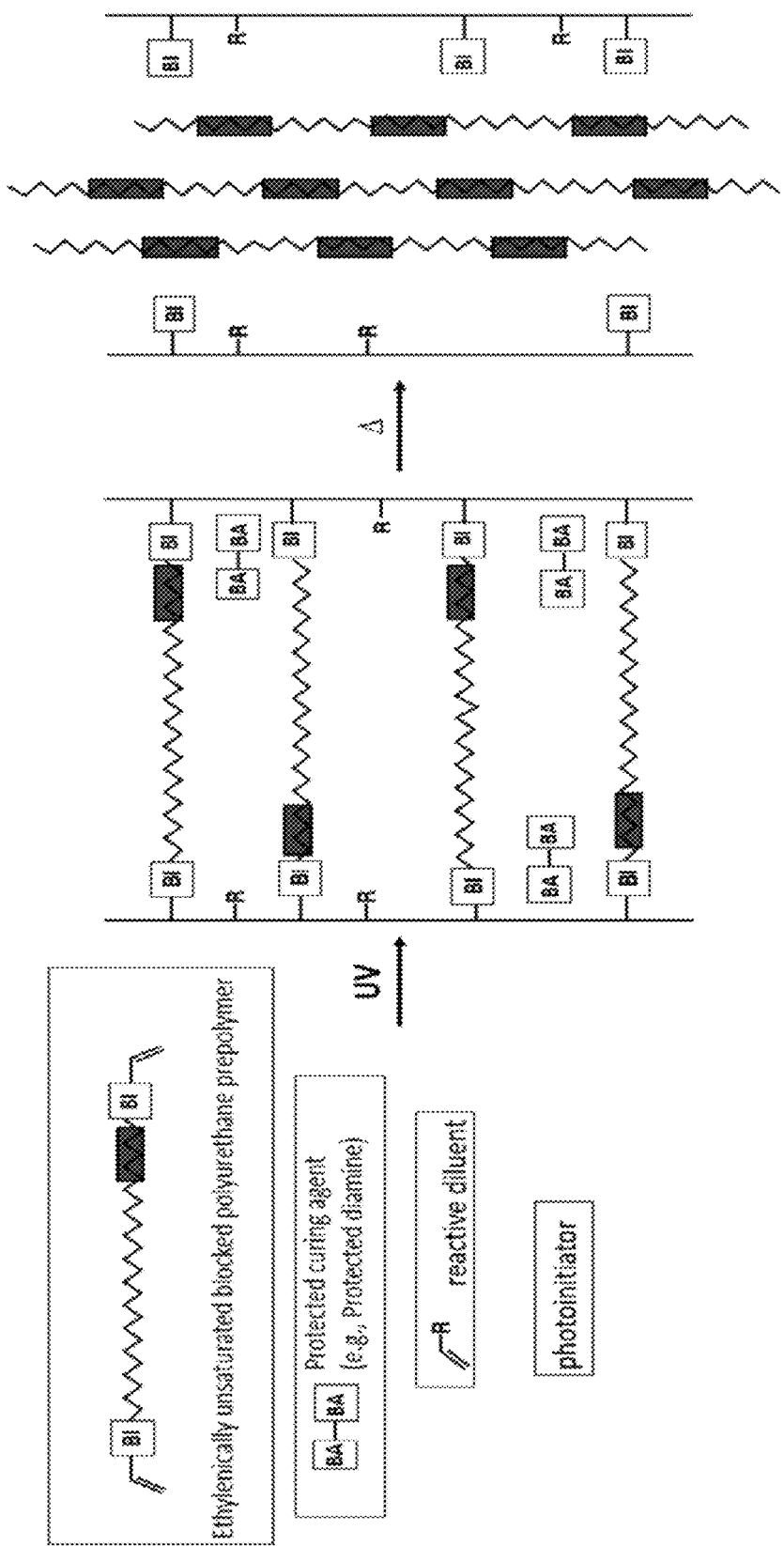
FIG. 1 is a schematic illustration of one embodiment of the Curing scheme A: Dual curing resin materials employing curing agents that do not participate in photopolymerization.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

"Diisocyanate" and "polyisocyanate" are used interchangeably and refer to aliphatic, cycloaliphatic, aromatic isocyanates that have at least 2, or in some embodiments more than 2, isocyanate (NCO) groups per molecule, on average.

"Diol" and "polyol" are used interchangeably and refer to aliphatic, cycloaliphatic, aromatic alcohols that have at least 2, or in some embodiments more than 2 hydroxyl (OH) groups per molecule, on average.

As used herein, the term "and/or" refers to any and all possible combinations of one or more listed components, as well as any and all possible of single component that lacks of any combination. For example, "A, B, and/or C" means all of the following possibilities: A alone, B alone, C alone, A and B, A and C, B and C, A, B and C.

As used herein, the term "visible light" refers to electromagnetic radiation having wavelengths in the range of 400 to 700 nanometers (nm). "Ultraviolet light" as used here refers to electrometric radiation having wavelength in the range of 10 to 400 nanometers (nm).

As used herein, the term "stereolithography" or "photopolymerization" refers to a technique for making three-dimensional objects using light-initiated photopolymerization of liquid resin with the presence of photoinitiator.

As used herein, the term "curing", "solidification" or "polymerization" refers to a process of reacting monomers, oligomers, prepolymers, and/or polymers, with or without a curing agent to form a three-dimensional polymeric network.

Polymerizable liquids as described herein may be used in additive manufacturing industry to produce three-dimensional objects. In some embodiments, the polymerizable liquid may comprise the following components:

(a) a blocked or reactively blocked polyurethane prepolymer;
(b) (optional) a reactive diluent;
(c) a blocked or reactively blocked curing agent;
(d) a photoinitiator; and
(e) (optional) a blocked or reactively blocked diisocyanate.

Polymerizable Liquid: Blocked or Reactively Blocked Polyurethane Prepolymer

In some embodiments, the blocked or reactively blocked polyurethane prepolymers comprise a compound of the following formula (A):

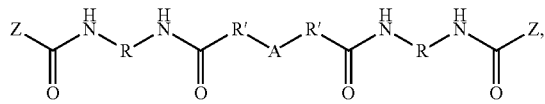

where A and R are an independently selected hydrocarbyl group, R' is NH or O, and Z is a blocking group. The linkage between the blocking group Z and the isocyanate groups (—NCO) is thermally or otherwise labile so that under proper conditions, such linkage may break to expose the isocyanate groups (—NCO), enabling the free isocynate to react with other components for further reaction. Examples of the NCO blocking group Z may include but not limited to phenols, nonyl phenols, pyridinols, oximes, thiophenol s, mercaptans, amides, cyclic amides, imides, imidazole, imidazoline, methylethylketoxime (MEKO), alcohols, ε-caprolactam, pyrazoles, triazoles, amidines, hydroxaic acid ester.

In some embodiments, the NCO blocking group Z optionally comprises a reactive terminal group, which makes the polyurethane prepolymer reactively blocked. Examples of the the reactive terminal group of Z may include but not limited to epoxy, alkene, alkyne, thio, vinyl either. In one embodiment, the blocking group Z is tert-butyl aminoethyl methacrylate (t-BAEMA) with the following formula:

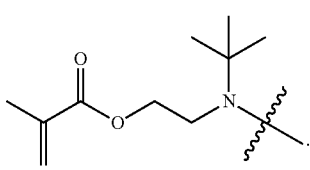 [SMILES: *N(CCOC(=O)C(=C)C)C(C)(C)C]

In this example, the steric hindrance of the large tertiary butyl group makes the linkage between the blocking group and the isocyanate (—NCO) group thermally labile. Cleavage of this linkage may be expected upon heating, allowing the isocyanate (—NCO) group to react with curing agent and/or other components in the polymerizable liquids. In other examples, the blocking group Z may be tertiary penylaminoethyl methacrylate (TPAEMA), tertiary hexylaminoethyl methacrylate (THAEMA), tertiary-butylaminopropyl methacrylate (TBAPMA), and mixture thereof. Those skilled in the art may couple (meth)acrylate groups to known NCO blocking agents as identified above.

In some embodiments, the blocked or reactively blocked polyurethane prepolymer comprises a polyisocyanate oligomer synthesized by the reaction of at least one diisocyanate and one polyol. Examples of diisocyante may include but not limited to isophorone diisocyanate (IPDI), hexamethylene diisocyanate (HDI), methylenebis(phenyl isocyanate) (MDI), toluene diisocyanate (TDI), naphthalene diisocyanate (NDI), methylene bis-cyclohexylisocyanate (HMDI). Examples of polyols may include but not limited to polyether polyols and polyester polyols. One specific example of polyol is poly (propylene oxide) (PPO).

Examples of such reaction schemes were described in Velankar, Pazos, and Cooper, Journal of Applied Polymer Science 162, 1361 (1996), the disclosures of which is incorporated by reference herein in their entirety.

Polymerizable Liquid: Reactive Diluent

In some embodiments, the reactive diluent may be photopolymerizable monomer or oligomer having photopolymerizable groups. In some embodiments, the photopolymerizable groups may be groups that can undergo radical polymerization. In other embodiments, photopolymerizable groups may be groups that can undergo cationic polymerization. In some embodiments, the photopolymerizable monomer or oligomer may comprise an acrylate, a methacrylate, an alkene, a N-vinyl, a vinyl amide, a vinyl ether, a vinyl ester, an acrylamide, a meth acrylamide, a styrene, an acrylate acid, an epoxy, a thio, a 1,3-dienes, a vinyl halide, an acrylonitrile, a vinyl ester, a maleimide, a vinyl ether, and combination of two or more of the foregoing. In some embodiments, the photopolymerizable monomer or oligomer may comprise epoxy/amine, epoxy/hydroxy, oxetane/amine, oxetane/hydroxy. Reactive diluents may decrease the viscosity of the photopolymerized polymer network and copolymerize with photopolymerizable components in the polymerizable liquid.

In some embodiments, the reactive diluent may have degree functionality of one or more than one. Some examples of reactive diluent may include but not limited to: 1,3-propanediol diacrylate and dimethacrylate, 1,4-butanediol diacrylate and dimethacrylate, 1,5-pentanediol diacrylate and dimethacrylate, 1,6-hexanediol diacrylate and dimethacrylate, 1,7-heptanediol diacrylate and dimethacrylate, 1,8-octanediol diacrylate and dimethacrylate, trimethylolpropanetriol triacrylate and trimethacrylate, ethoxylated trimethylolpropanetriol triacrylate and trimethacrylate, neopentyl glycol diacrylate and dimethacrylate, tripropylene glycol diacrylate and dimethacrylate, pentaerythritol triacrylate and trimethacrylate, pentaerythritol tetraacrylate and tetramethacrylate, and the like. In some embodiments, certain reactive diluent or certain combination of reactive diluents are chosen in order to increase the solubility of the photoinitiator used herein. In preferred embodiments, monomers with low degree of functionality are used to increase solubility of photoinitiators with the powder form.

Polymerizable Liquid: Photoinitiator

Photoinitiator may be any suitable photoinitiator that can initiate the photopolymerization reaction with the light source used to initiate the photopolymerization reaction. In some embodiments, the wavelength used to initiate the photopolymerization process is 405 nm and in other embodiments, the wavelength is 385 nm. Examples of photoinitiators may include but not limited to benzoin ethers

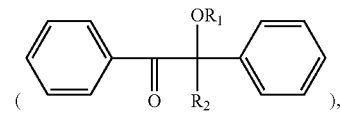

dialkoxy acetophenones

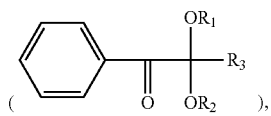

hydroxy alkyl ketones

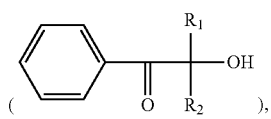

acyl phosphine oxides

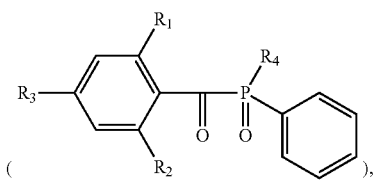

amino ketones

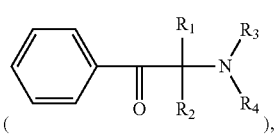

benzophenones

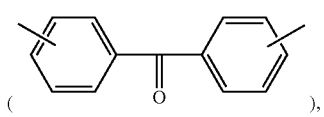

thioxanthones

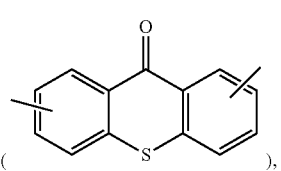

1,2 diketones

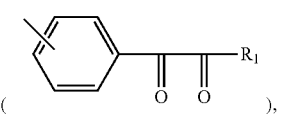

camphorquinon

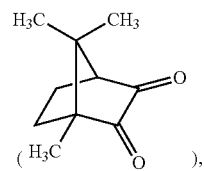

bis(eta.5-2,4-cylcopentadien-1-yl)-bis(2,6-difluoro-3-(1H-pyrrol-1-yl)-phenyl) titanium

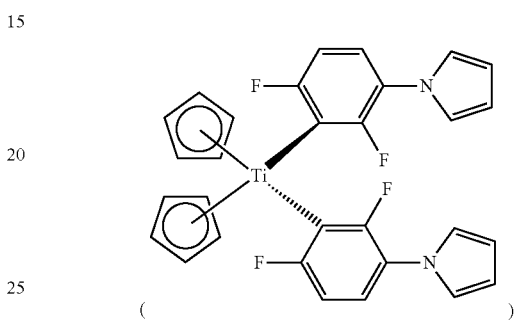

where Rn is any number of other atoms, including H, O, C, N, S. In some preferred embodiments, photoinitiators used herein are benzoyl phosphine oxides, including: TPO

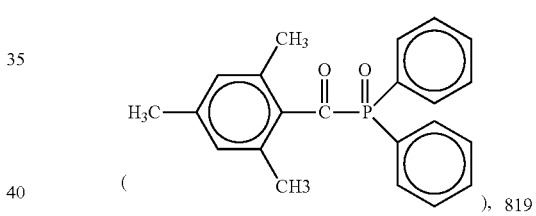, 819

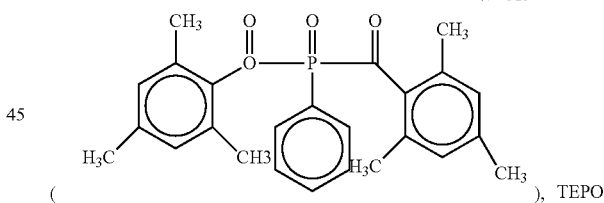, TEPO

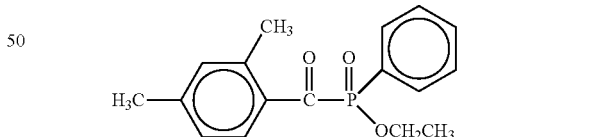

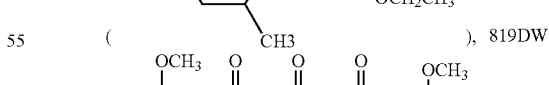, 819DW

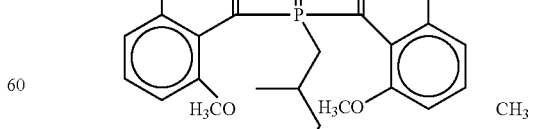

.

Polymerizable Liquid: Blocked or Reactively Blocked Diisocyanate

In some embodiments, the polymerizable liquid may optionally comprise blocked or reactively blocked diisocyanate. In some embodiments, the blocked or reactively blocked diisocyanate may comprise a compound of the following Formula:

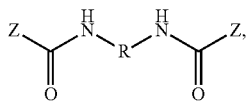

where R is a hydrocarbyl group and Z is a blocking group. Examples of the blocking group Z may include but not limited to phenols, nonyl phenols, pyridinols, oximes, thiophenols, mercaptans, amides, cyclic amides, imides, imidazole, imidazoline, Methylethylketoxime (MEKO), alcohols, ε-caprolactam, pyrazoles, triazoles, amidines, hydroxaic acid ester. The linkage between the blocking group Z and the isocyanate groups (—NCO) is thermally or otherwise liable so that under proper conditions, such linkage may break to exposed the isocyanate group, enabling the free isocyanate to react with other components for further reaction. In some embodiments, the blocking group Z optionally comprises a reactive terminal group, which makes the diisocyanate reactively blocked. Examples of the the reactive terminal group of Z may include but not limited to epoxy, alkene, alkyne, thio, vinyl either. In one embodiment, the blocking Z is tert-butyl aminoethyl methacrylate (t-BAEMA) with the following structure:

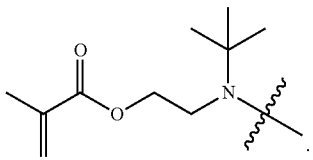 [SMILES: *N(CCOC(=O)C(=C)C)C(C)(C)C]

In this example, the steric hindrance of the large teriary butyl group makes the linkage between the blocking group and the isocyanate (—NCO) group thermally labile. Cleavage of this bond may be expected upon heating, allowing the isocyanate (—NCO) group to react with curing agents in the polymerizable liquids. In other examples, the blocking group Z may be tertiary penylaminoethyl methacrylate (TPAEMA), tertiary hexylaminoethyl methacrylate (THAEMA), tertiary-butylaminopropyl methacrylate (TBAPMA), and mixture thereof. Those skilled in the art may couple (meth)acrylate groups to known NCO blocking agents as identified above.

Polymerizable Liquid: Blocked or Reactively Blocked Curing Agent

In some embodiments, the blocked or reactively blocked curing agent may comprise a compound of the following Formula (A1), Formula (A2), or Fomula (A3):

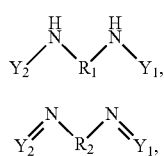
(A1)

(A2)

(A3)
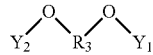

wherein $R_1$, $R_2$, and $R_3$ are each independently a liner or branched C1-C36 alkyl or alkylene, alkenyl or alkenylene, aryl or arylene, heteroaryl or heteroarylene, cycloalkyl or cycloalkenyl moiety and $Y_1$ and $Y_2$ are each independently selected protecting groups that protect amino groups or hydroxyl groups. In some embodiments, $Y_1$ and $Y_2$ are each independently selected and have different structures. In other embodiments, $Y_1$ and $Y_2$ may have the same structures. Using curing agent with protecting groups may help increase the stability of the polymerizable liquid. In this way, the different components may be mixed and stored without having the polymerization reaction between the curing agent and the polyurethane prepolymer occurred prematurely. The polymerization reaction between the curing agent and the polyurethane prepolymer can be controlled to occur only when the protecting groups are removed.

Examples of the amino group protecting group $Y_1$ and/or $Y_2$ may include but not limited to an alkoxycarbonyl, an acyl group, an alkyl group, and a combination thereof. In some embodiments, the alkoxycarbonyl group may comprise a benzyloxycarbonyl

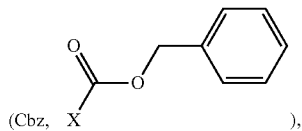
(Cbz, X                ), a tert-butoxycarbonyl

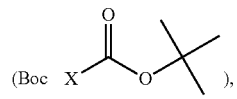
(Boc  X              ), a methoxycarbonyl

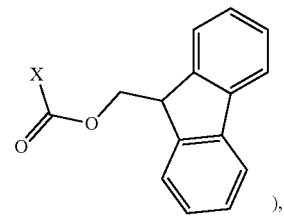
(Fmoc,                ), an allyloxycarbonyl

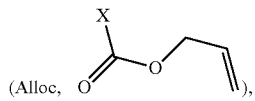
(Alloc,               ), a trimethylsilyloxycarbonyl

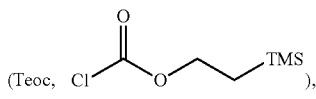

a methoxycarbonyl or an ethoxycarbonyl

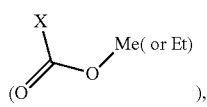

and a combination thereof. In some embodiments, the acyl group may comprise a phthalate

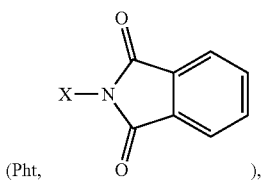

a p-toluenesulfonyl

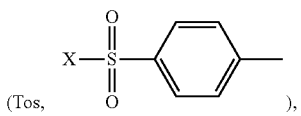

a trifluoroacetyl

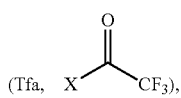

and a combination thereof. In some embodiments, the alkyl group may comprise a tritylmethyl

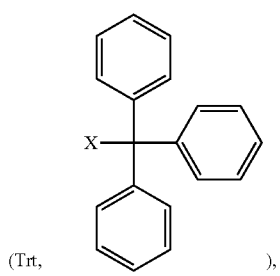

a 2,4-dimethoxybenzyl

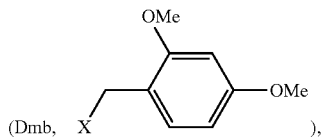

a p-methoxybenzyl

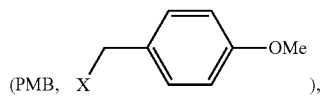

a benzyl

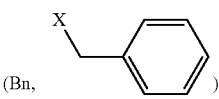

and a combination thereof. In some embodiments, the amino group protecting group $Y_1$ and/or $Y_2$ may also comprise 1-chloroethyl carbamate, 4-methoxybenzenesulfonamide, acetamide, benzylamine, benzyloxy carbamate, formamide, methyl carbamate, trifluoroacetamide, and a combination thereof. More examples of the amino group protecting groups can be found in Protective Groups in Organic Chemistry, J. McOmie, Springer Science & Business Media, declaration 2012.

Examples of the hydroxyl group protecting group $Y_1$ and/or $Y_2$ may include but not limited to a silicon ether, a benzyl ether, a substituted benzyl ether, a substituted methyl ether, an alkoxymethyl ether, an allyl ether, an acyl ether and a combination thereof. In some embodiments, the silicon ether may comprise a trimethylsilyl ether (TMS), a t-Butyldimethylsilyl ether (TBDMS), a tert-butyldiphenylsilyl ether (TBDPS), a tri-isopropylsilyl ether (TIPS), and a combination thereof. In some embodiments, the benzyl ether (Bn) may comprise an alkyl hydroxy benzyl ether, a p-methoxybenzyl ether (PMB), a trityl ether, and a combination thereof. In some embodiments, the alkoxymethyl ether may comprise a 2-tetrahydropyran ether (THP), a methoxymethyl acetal (MOM), a 2-ethoxyethyl ether (EE), 2-(Trimethylsilyl)ethoxy]methyl acetal (SEM) and a combination thereof. In some embodiments, the hydroxyl group protecting group $Y_1$ and/or $Y_2$ may comprise an acetyl, a benzoyl, a pivaloyl, an acetate, a benzoate, a pivalate, and a combination thereof. In some embodiments, the hydroxyl group protecting group $Y_1$ and/or $Y_2$ may also comprise 2,2,2,-trichloroethyl carbonate, 2-methoxyethoxymethyl ether, 2-naphthylmetheyl ether, 4-methoxybenzyl ether, acetate, benzoate, benzyl ether, benzyloxymethyl acetal, ethoxyethyl acetal, methoxymethyl acetal, methoxypropyl acetal, methyl ether, tetrahydropyranyl acetal, triethylsilyl ether, triisopropylsilyl ether, trimethylsilyl ether, tert-butyldiphenylsilyl ether, acetonide, benzaldehyde acetal, carbonate, benzaldehyde acetal, di-tert-butyl dioxasilinane, and a combination thereof. More examples of the hydroxyl group protection groups can be found in Protective Groups in Organic Chemistry, J. McOmie, Springer Science & Business Media, declaration 2012.

In some embodiments, when the curing agent is a protected amine or a protected imine, the protecting group $Y_1$ and/or $Y_2$ may comprise carboxylic acid groups, anhydride groups (an example of such anhydride is di-tert-butyl decarbonate ($Boc_2O$), acid chloride groups (examples were described in U.S. Pat. Nos. 5,231,147, 3,639,657, 4,430,489, the disclosure of which are incorporated herein by reference), aldehyde or ketone groups (examples were described in U.S. Pat. No. 3,932,357, the disclosure of which is incorporated herein by reference), complexes of metal salts (an example of such metal salt, methylenedianiline-NaCl was described in US Patent Application US 20070213497A1, the disclosure of which is incorporated herein for reference).

In some embodiments, the protecting groups $Y_1$ and/or $Y_2$ in the curing agent may further comprise a photopolymerizable group. Examples of such photopolymerizable groups may include but not limited to an acrylate, a methacrylate, an alkene, a N-vinyl, an acrylamide, a methacrylamide, a styrene, an epoxy, a thio, a 1,3-dienes, a vinyl halide, an acrylonitrile, a vinyl ester, a maleimide, a vinyl ether, and combination of two or more of the foregoing. In some embodiments, the photopolymerizable group may comprise epoxy/amine, epoxy/hydroxy, oxetane/amine, oxetane/hydroxy. In some embodiments, $Y_1$ and $Y_2$ are each independently selected and have different structures. For example, one of the protecting groups comprise a photopolymerizable terminal group while the other does not.

In some embodiments, the protecting group $Y_1$ and/or $Y_2$ may comprise a photopolymerizable (meth)acrylate group. In some embodiments, the protecting groups $Y_1$ and/or $Y_2$ are each independently selected and having the same or different structures. Those skilled in the art may couple (meth)acrylate groups or other photopolymerizable terminal groups to known amino or hydroxyl group protecting groups as identified above.

In some embodiments, the protecting group $Y_1$ and/or $Y_2$ in its unsubstituted form may comprise a compound of the following Formula:

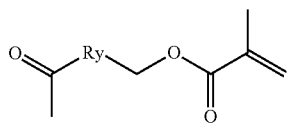

(the O atom in the ketone group will be substituted when coupled to amino or hydroxyl groups to protect them), wherein Ry may be:

(1). linear or branched hydrocarbyl groups. In some embodiments, the number of carbon atoms in the hydrocarbyl groups may be in the range of 1-10. In one example, the protecting group $Y_1$ and/or $Y_2$ in its unsubstituted form may have the molecular structure as the following:

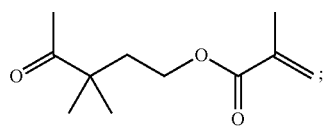

in another example, the protecting groups $Y_1$ and/or $Y_2$ in its unsubstituted form may have the molecular structure as the following:

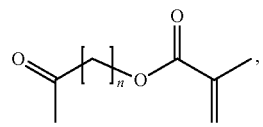

wherein n may be an integer in the range of 1-10;

(2). repeating units comprising alkoxy group. In some embodiments, the number of the repeating units may be in the range of 1-10. In one example the protecting groups $Y_1$ and/or $Y_2$ in its unsubstituted form may have the molecular structure as the following:

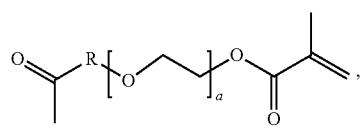

wherein n may be an integer in the range of 1-10 and R is a linear or branched hydrocarbyl group;

(3). repeating units comprising ester group;
(4). repeating units comprising siloxy group; or
(5). repeating units comprising thioether group.

Some examples of the preparation of the protecting groups $Y_1$ and/or $Y_2$ described above is shown in the Schemes below:

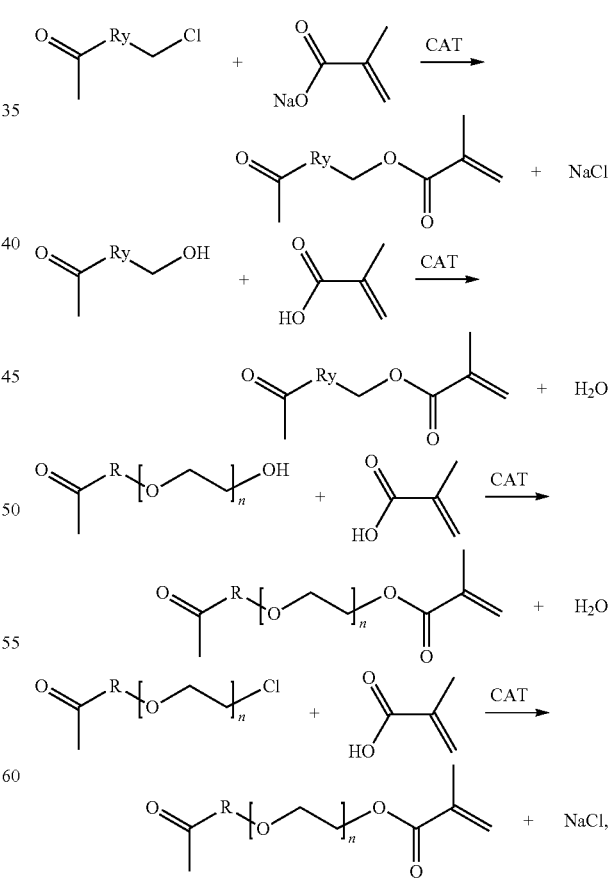

wherein CAT is a phase transfer catalyst. Examples of such phase transfer catalyst that can be used here may comprise amine salts (such as benzyltriethylammonium chloride (TEBA) or ammonium bromide (TEBA-Br), benzyltrimethylammonium chloride, ammonium bromide or ammonium hydroxide (Triton B), tetrabutyl chloride Ammonium bromide, ammonium iodide or ammonium hydroxide, cetyltrimethylammonium bromide, ammonium chloride, tetra-n-hexylammonium bromide, ammonium chloride, etc.), crown ethers (such as 15-crown-5, 18-crown-6, dibenzo-18-crown-6, etc.), phosphonium salts (such as tributylphosphonium bromide, ethyltriphenylphosphonium bromide, tetraphenylphosphonium chloride, etc.) In some embodiments, the phase transfer catalyst may be used together with agents such as dicyclohexylcarbodiimide (DCC) to promote the esterification reaction.

In some embodiments, the protecting groups $Y_1$ and/or $Y_2$ in its unsubstituted form may be methyl isobutyl ketone (MIBK), where the O atom in the ketone group will be substituted when coupled to the amino or hydroxyl groups to protect them.

In some embodiments, the blocked or reactively blocked curing agent may comprise a compound of the following Formula (A4), Formula (A5), or Fomula (A6):

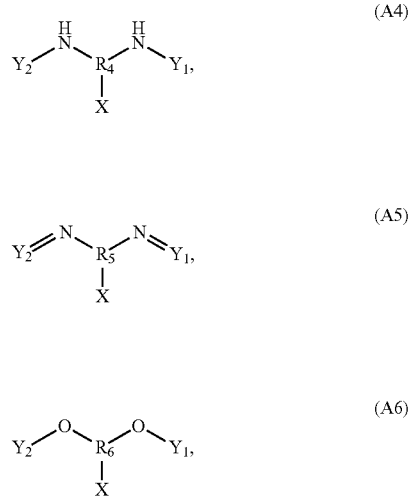

wherein $R_4$, $R_5$, and $R_6$ are each independently an amino-dialkyl, an C6-C36 aryl or arylene, a C6-C36 heteroaryl or heteroarylene, C3-C36 cycloalkyl or cycloalkenyl moiety, X comprises a photopolymerizable group, and $Y_1$ and $Y_2$ are each independently selected protecting groups that protect amino groups or hydroxyl groups. In some embodiments, $Y_1$ and $Y_2$ are each independently selected and have different structures. In other embodiments, $Y_1$ and $Y_2$ may have the same structures. In these embodiments, the curing agent comprises a crosslinking curing site, X, that enables the curing agent to crosslink the thermoplastic polyurethane segments with UV-cured crosslinked acrylate part in the dual curing process to form an acrylic-urethane copolymer network. Compared to the acrylate-urethane system that crosslinked acrylate and urethane are not copolymerized, such copolymer network not only maintains the high elongation and elastic properties, it also makes the network stronger and more endurable. In some embodiments, $R_4$, $R_5$, and $R_6$ may have more than three substituted sites.

In some embodiments, the curing agent may have the molecular structure as the following:

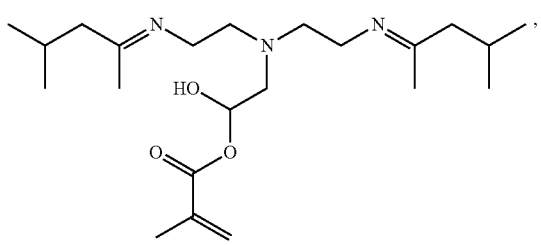 [SMILES: C=C(C)C(=O)OC(O)CN(CC/N=C(\C)CC(C)C)CC/N=C(\C)CC(C)C]

which is an example of Formula $A_5$ with $R_5$ being a diethylamino group, X being a 2-hydroxypropyl methacrylate and $Y_1$ and $Y_2$ being a methyl isobutyl ketone (MIBK) group (with the oxygen atom in the ketone group substituted when reacting with amine). In this example, the curing agent may be synthesized with the following reaction scheme:

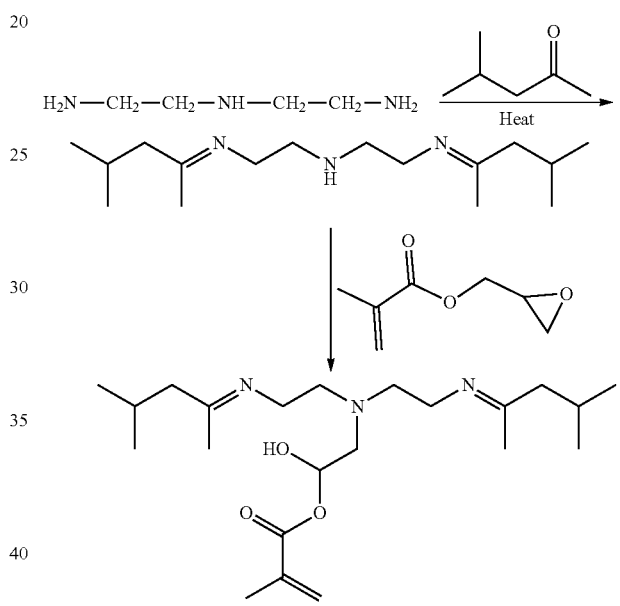

In addition to diethylenetriamine (DETA) used to synthesize the above curing agent, those skilled in the art may use other type of amine compounds to prepare the curing agent having a crosslinking curing site. Examples may include but not limited to triethylenetetramine (TETA) and N-(4-Aminocyclohexyl)-1,4-cyclohexanediamine.

Some embodiments of the present invention disclosed a method of forming a three-dimensional object using the polymerizable liquids described herein. The method may comprise the following steps:

(1). providing a printing region defined by a forming platform and a resin reservoir having a forming surface;

(2). filling the printing region with a polymerizable liquid comprising:
  a) a blocked or reactively blocked polyurethane prepolymer;
  b) (optional) a reactive diluent;
  c) a blocked or reactively blocked curing agent;
  d) a photoinitiator; and
  e) (optional) a blocked or reactively blocked diisocyanate;

(3). exposing the printing region to light to form a solid printing intermediate having substantially the same shape as the three-dimensional object; in some embodiments, the blocked or reactively blocked curing agent is contained in the printing intermediate in a uncured or unsolidified form; in other embodiments, the blocked or reactively blocked curing agent may participate in the photopolymerization process when exposed to light through its photopolymerizable terminal groups and as a result, is contained in the printing intermediate in a cured or solidified form.

(4). (optional) washing the printing intermediate;

(5). heating, microwave irradiating, exposing to water vapor or using other methods to provide energy to the printing intermediate to form the three-dimensional object through a second step of curing; under heating, microwave irradiating, moisturizing conditions or other known conditions, the blocking groups in the polyurethane prepolymer and the protecting groups in the curing agent will undergo cleavage, which means that the linkage between the blocking/protecting groups and the blocked/protected parts will be cleaved so that the blocked/protected parts can be exposed for further curing. Depending on the various designs of the curing agent described herein, there may be different curing schemes for the present invention. Non-limiting examples of such curing schemes are described further below.

A. Dual Curing Resin Materials Employing Curing Agents that do not Participate in Photopolymerization Reaction In these embodiments, the protecting groups $Y_1$ and $Y_2$ are each independently selected protecting groups that protect amino groups or hydroxyl groups but do not comprise photopolymerizable groups. In these embodiments, when the polymerizable liquid comprising such curing agent is exposed to light to form a solid printing intermediate, the printing intermediate contains the curing agent in its uncured or unsolidified form. Following the photopolymerization, under heating, microwave irradiating, moisturizing conditions, or other known suitable conditions, the protecting groups $Y_1$ and $Y_2$ are cleaved and expose the originally protected amino or hydroxyl groups for further curing. An example of such curing scheme is illustrated in FIG. 1.

In the example illustrated in FIG. 1, the polyurethane prepolymer terminated with ethylenically unsaturated blocking groups undergoes photopolymerization reaction (optionally) together with the reactive diluent to form a crosslinked network (i.e., a solid printing intermediate) containing the protected curing agent in its uncured form. In the reaction scheme illustrated in FIG. 1, the curing agent is a diamine compound. After the photopolymerization, under heating, microwave irradiating, moisturizing conditions or other known suitable conditions, the blocking groups that block the isocyante groups are cleaved and expose them for further curing. Also under the same condition, the protecting groups in the curing agent that protect the amino groups are also cleaved and expose the amino groups to react with isocyante groups to form a network that comprises the following: (a) linear thermoplastic polyurethane, polyurea, and/or copolymer thereof; (b) crosslinked thermoset polyurethane, polyurea, and/or copolymer thereof; (c) UV-cured polyacrylates (linear or crosslinked); and (d) combinations thereof. Such network may be an interpenetrating polymer network (IPN), a semi- or pseudo-IPN, a sequential IPN. However, in these embodiments, the polyurethane part of network and polyacrylates part of network are not covalently bonded. In some embodiments, the network also comprises other components, for example, the copolymer of the de-protected curing agent and the reactive diluent, and unreacted photoinitiator, etc.

B. Dual Curing Resin Materials Employing Curing Agents that Participate in Photopolymerization In these embodiments, the protecting groups $Y_1$ and $Y_2$ are independently selected protecting groups that protect amino groups or hydroxyl groups and further comprise photopolymerizable groups. In these embodiments, when the polymerizable liquid comprising such curing agent is exposed to light to form a solid printing intermediate, the printing intermediate contains the curing agent in a cured or solidified form. An example of such curing scheme is illustrated in FIG. 2.

Figure 2:
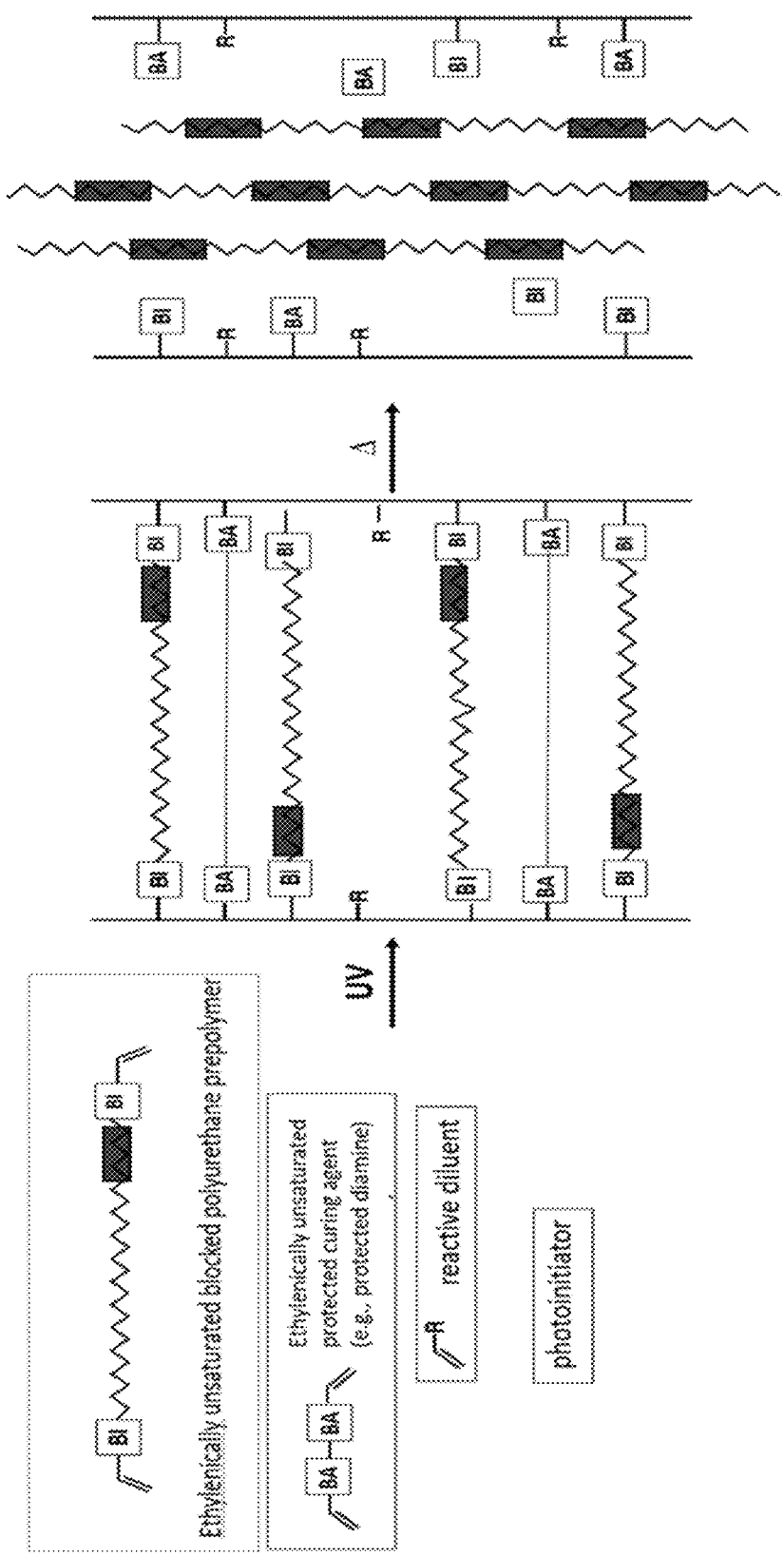
FIG. 2 is a schematic illustration of one embodiment of the Curing Scheme B: Dual curing resin materials employing curing agents that participate in photopolymerization.

In the example illustrated in FIG. 2, the polyurethane prepolymer terminated with ethylenically unsaturated protected groups undergoes photopolymerization reaction together with also ethylenically unsaturated protected curing agent and (optionally) reactive diluent under photo irradiation to form a crosslinked network (i.e., a solid printing intermediate) containing the protected curing agent in its cured or solidified form. In the reaction scheme illustrated in FIG. 2, the curing agent is a diamine compound, protected on both ends with photopolymerizable protecting groups. Because in these embodiments, the curing agent is contained in the printing intermediate in its cured or solidified form, as a result, the printing intermediate may have stronger mechanical strength and be easier for the post-processing handling. After the photopolymerization, under heating, microwave irradiating, moisturizing conditions or other known suitable conditions, the blocking groups that block the isocyanate groups are cleaved and expose them for further curing. Also under the same condition, the protecting groups in the curing agent that protect the amino group are also cleaved and expose the amino groups to react with isocyanate groups to form a network that comprise the following: (a) linear thermoplastic polyurethane, polyurea, and/or copolymer thereof; (b) crosslinked thermoset polyurethane, polyurea, and/or copolymer thereof; (c) UV-cured polyacrylates (linear or crosslinked); and (d) combinations thereof. Such network may be an interpenetrating polymer network (IPN), a semi- or pseudo-IPN, a sequential IPN. However, in these embodiments, the polyurethane part of network and polyacrylates part of network are not covalently bonded. In some embodiments, the network also comprises other components, for example, the copolymer of the de-protected curing agent and the reactive diluent, and unreacted photoinitiator, etc.

C. Dual Curing Resin Materials Employing Curing Agent that Comprises Asymmetrical Protecting Groups In these embodiments, the protecting groups $Y_1$ and $Y_2$ are independently selected protecting groups that protect amino groups or hydroxyl groups and have different chemical structures. In some examples, one of the two protections groups comprise photopolymerizable terminal group and the other does not. In these embodiments, when the polymerizable liquid comprising such curing agent is exposed to light to form a solid printing intermediate, the printing intermediate contains the curing agent in a cured or solidified form. An example of such curing scheme is illustrated in FIG. 3.

Figure 3:
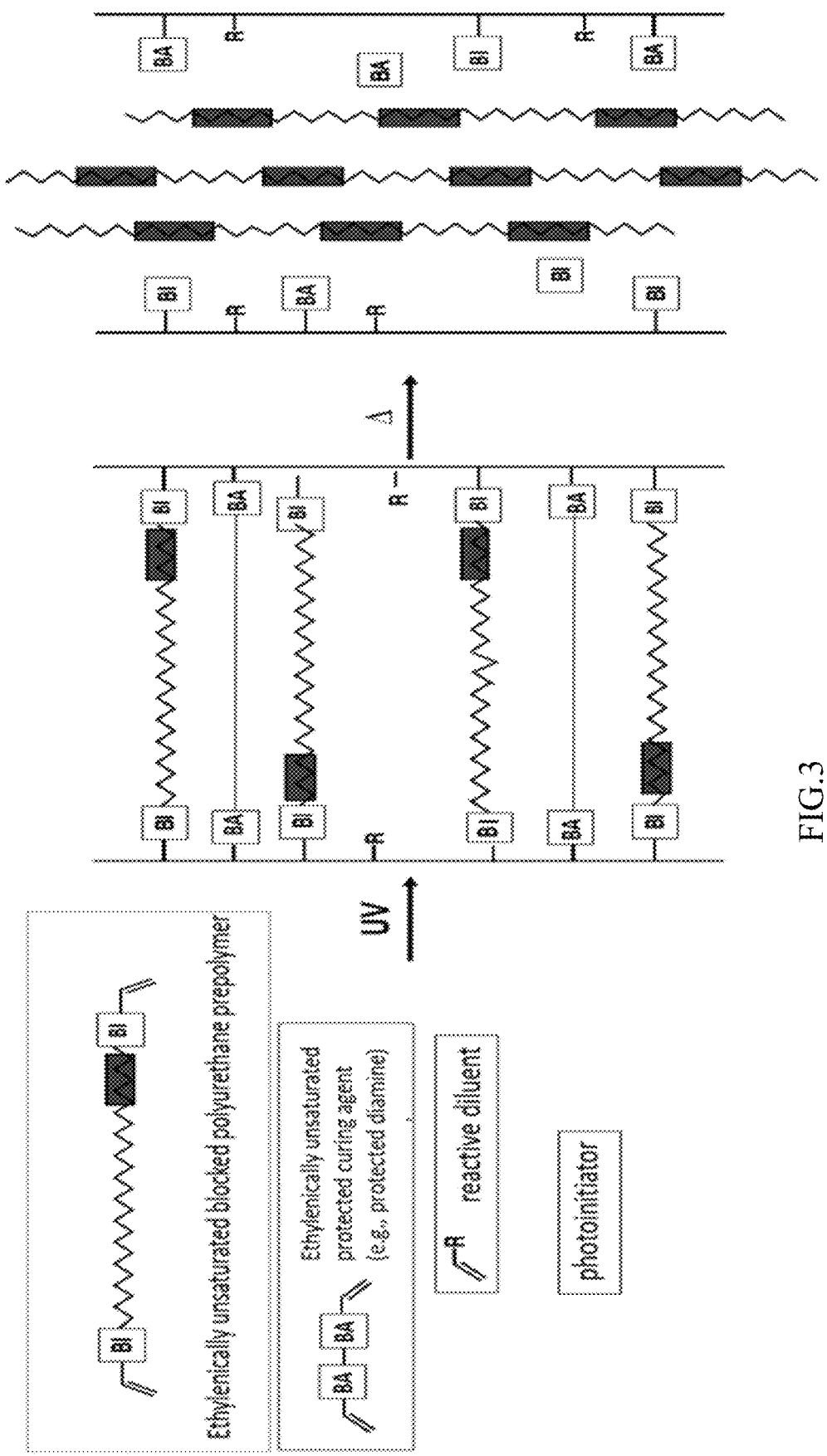
FIG. 3 is a schematic illustration of one embodiment of the Curing Scheme C: Dual curing resin materials employing curing agents that comprise asymmetrical protecting groups.

In the example illustrated in FIG. 3, the polyurethane prepolymer terminated with ethylenically unsaturated blocking groups undergoes photopolymerization reaction together with also ethylenically unsaturated protected curing agent only on one end and (optionally) reactive diluent under photo irradiation to form a crosslinked network (i.e., a solid printing intermediate) containing the protected curing agent in its cured form. In the reaction scheme illustrated in FIG. 3, the curing agent is a diamine compound, protected only on one end with one photopolymerizable protecting group. Because in these embodiments, the curing agent is contained in the printing intermediate in its cured form, as a result, the printing intermediate may have stronger mechanical strength and be easier for the post-processing handling. After the photopolymerization, under heating, microwave irradiating, moisturizing conditions or other known suitable conditions, the blocking groups that block the isocyante groups are cleaved and expose them for further curing. Also under the same condition, the protecting groups in the curing agent that protect the amino group are also cleaved and expose the amino groups to react with isocyante groups to form a network that comprise the following: (a) linear thermoplastic polyurethane, polyurea, and/or copolymer thereof; (b) crosslinked thermoset polyurethane, polyurea, and/or copolymer thereof; (c) UV-cured polyacrylates (linear or crosslinked); and (d) combinations thereof. Such network may be an interpenetrating polymer network (IPN), a semi- or psudo-IPN, a sequential IPN. However, in these embodiments, the polyurethane part of network and polyacrylates part of network are not covalently bonded. Compared to the above Curing Scheme B, this curing scheme C offers another option that allows one to adjust the composition of the final three-dimensional network in order to adjust the physical properties of the three-dimensional printed objects. In some embodiments, the network also comprises other components, for example, the copolymer of the de-protected curing agent and the reactive diluent, and unreacted photoinitiator, etc.

D. Dual Curing Resin Materials Employing Curing Agent that Comprises a Crosslinking Curing Site In these embodiments, the protecting groups $Y_1$ and $Y_2$ are each independently selected protecting groups that protect amino groups or hydroxyl groups but do not participate in the photopolymerization reaction. The curing agent further comprises a crosslinking curing site, X, that enables the curing agent crosslinking the thermoplastic polyurethane segments with UV-cured crosslinked polyacrylate part in the dual curing process to form an acrylic-urethane copolymer. In these embodiments, when the polymerizable liquid comprising such curing agent is exposed to light to form a solid printing intermediate, the printing intermediate contains the curing agent in a cured or solidified form. An example of such curing scheme is illustrated in FIG. 4.

Figure 4:
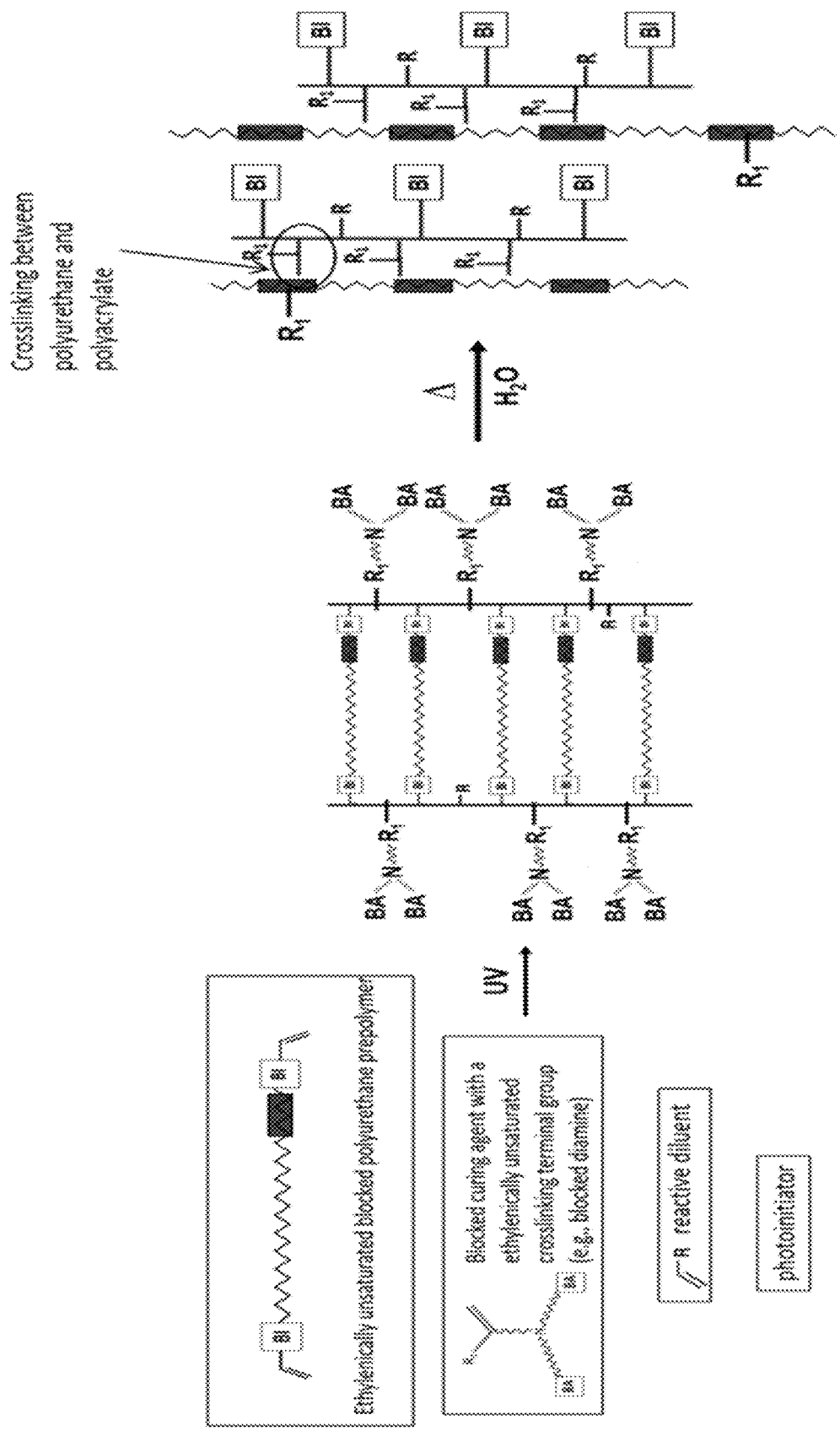
FIG. 4 is a schematic illustration of one embodiment of the Curing Scheme D: Dual curing resin materials employing curing agent that further comprises a crosslinking curing site.

In the example illustrated in FIG. 4, the polyurethane prepolymer terminated with ethylenically unsaturated blocking groups undergoes photopolymerization reaction together with also ethylenically unsaturated protected curing agent on a crosslinking curing site and (optionally) reactive diluent under photo irradiation to form a crosslinked network (i.e., a solid printing intermediate) containing the curing agent in its cured form. In addition to the crosslinking curing site that enables the curing agent to participate in the photopolymerization, the curing agent also has one or more protected amino or hydroxyl groups that once deprotected, enables the reaction between the deblocked polyurethane prepolymer and the deprotected curing agent to form polyurethane. In the reaction scheme illustrated in FIG. 4, the curing agent is a diamine compound with two amino groups protected and one ethylenically unsaturated crosslinking curing site. Because in these examples, the curing agent is contained in the printing intermediate in its cured form, as a result, the printing intermediate may have stronger mechanical strength and be easier for the post-processing handling. After the photopolymerization, under heating, microwave irradiating, moisturizing conditions or other known suitable conditions, the blocking groups that block the isocyante group are cleaved and expose it for thermal curing. Also under the same condition, the protecting groups in the curing agent that protect the amino groups are also cleaved and expose the amino groups to react with isocyanate groups to form a network that comprise the following: (a) linear thermoplastic polyurethane, polyurea, and/or copolymer thereof; (b) crosslinked thermoset polyurethane, polyurea, and/or copolymer thereof; (c) UV-cured polyacrylates (linear or crosslinked); (d) copolymer of polyurethane, polyurea, and/or copolymer thereof and UV-cured polyacrylates; and (e) combinations thereof. Compared to previous curing schemes, this curing scheme covalently bonded the polyurethane part of the network and polyacrylates part of the network in the three-dimensional network. As a result, the formed three-dimensional printed object does not only maintain the good elongation property, but also offers better strength and durability. In some embodiments, the network also comprises other components, for example, the copolymer of the de-protected curing agent and the reactive diluent, and unreacted photoinitiator, etc.

Embodiments of the polymerizable liquids disclosed in the present invention can be used to manufacture three-dimensional objects using commonly known photopolymerization 3D printing technologies, such as stereolithography (SLA), Digital Light Processing (DLP), and Material Jetting (MJ). In some embodiments, an additive manufacturing method to produce three-dimensional objects using the polymerizable liquids of the present invention comprises the following steps:

(a). providing a printing region defined by a forming platform and a resin reservoir having a forming surface;

(b). filling said printing region with the polymerizable liquid disclosed in the present invention;

(c). exposing the printing region to energy to form a solid printing intermediate having substantially the same shape as the three-dimensional object;

(d). (optional) washing said printing intermediate;

(e). heating, microwave irradiating, or using other methods to provide energy to said printing intermediate to form said three-dimensional object.

In some embodiments, in the method described herein, the polymerizable liquid comprise from 1 percent by weight to 99 percent by weight the blocked or reactively blocked polyurethane prepolymer; and from 1 percent by weight to 99 percent by weight the blocked or reactively blocked curing agent.

In some embodiments, the solid printing intermediate is first manufactured by a DLP printer through the first curing step of photopolymerization. In some embodiments, the wavelength used to initiate the photopolymerization process is 405 nm and in other embodiments, the wavelength is 385 nm. Any suitable photoinitiator that can initiate the photopolymerization reaction with the light source used herein may be used. In some preferred embodiments, light with the wavelength longer than 400 nm is used to initiate the photopolymerization. In particular, 405 nm wavelength is used. In these preferred embodiments, photoinitiator Irgacure 819 is used for light with wavelength longer than 400 nm because 819 has a strong absorption in the family of phosphine oxide type of photoinitiator in the long wavelength UV range.

After the printing intermediate is formed, it is optionally washed and dried. In some embodiments, the washing liquid may be aqueous and comprise water and surfactant. In some embodiments, the water can be deionized water. Examples of surfactant may include but not limited to anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof.

After the optional washing step, the printing intermediate is further cured to form the final printed three-dimensional object. The second step of curing may be carried out by heat, moisturization, microwave irradiation, or other suitable energy source that can cleave the blocking/protecting groups used in the polymerizable liquid resins in order to initiate the second curing process. In some embodiments, the second step of curing is heating curing. In some embodiments, the temperature of the heat curing may be in the range of ambient temperature ~200° C. The length of the heat curing time may be in the range of 0.5 h~200 h. In some embodiments, the second step of curing is heating under moisturizing condition.

Embodiments of the present invention are explained in detail in the following non-limiting examples:

Example 1

Synthesis of Reactively Blocked Polyurethane Prepolymer 200 grams anhydrous polybutylene glycol (PTMG 1000) is added into 500-ml three-necked flask with an overhead stir, a thermometer and nitrogen protection. 67.2 grams hexamethylene diisocyanate (HDI) is then added into the flask to form a homogeneous solution with PTMG with 10-min's stirring, followed by addition of 140 µl of dibutyltindilaurate (DBTL) catalyst at 70° C. for 3 hours. After 3 hours, 75 grams of tertiary-butylaminoethyl methacrylate (TBAEMA) is gradually added. The temperature is then set at 50° C. with the addition of 100 ppm of benzene-1,4-diol. The reaction continues for 10 hours to produce Product A in a clear liquid form. The reaction scheme is illustrated in the following:

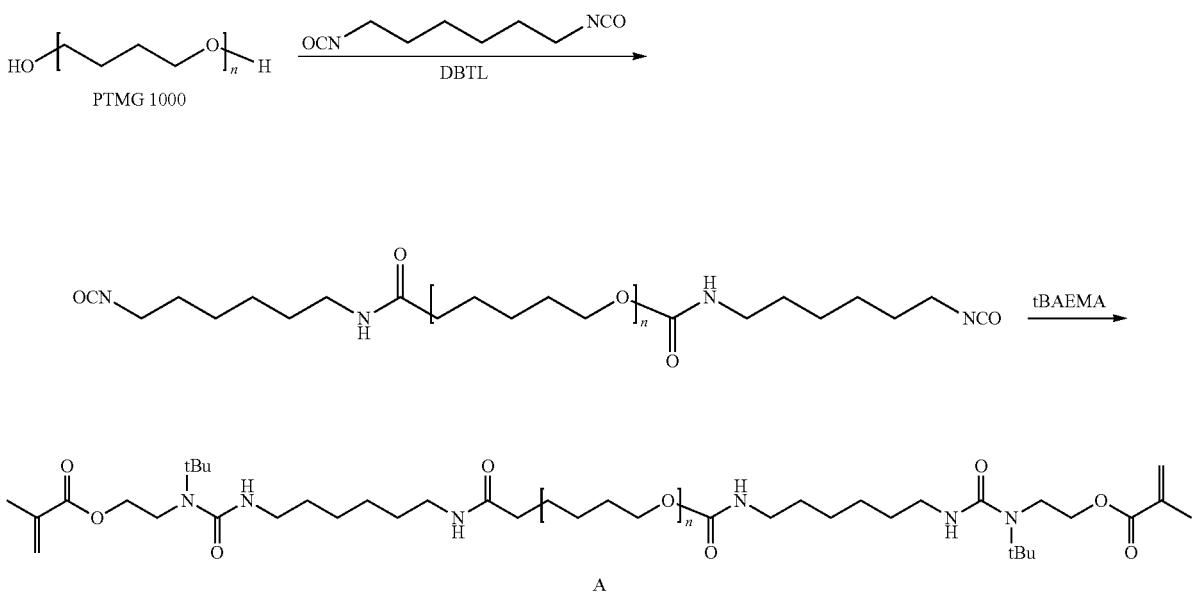

A

Example 2

Synthesis of the Reactively Blocked Diisocyanate 88.9 grams of isophorone diisocyanate (IPDI) is added into 500-ml three-necked flask with an overhead stir, a thermometer and nitrogen protection with 140 µl of DBTL catalyst and 75 grams of TBAEMA and 100 ppm of benzene-1,4-diol. The reaction continues for 3 hours at 70° C. to produce product B in a clear liquid form. The reaction scheme is illustrated in the following:

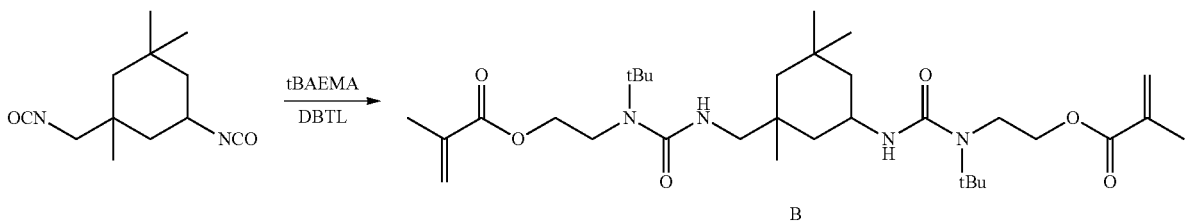

B

Example 3

One-Pot Synthesis of Reactively Blocked Polyurethane Prepolymer and Reactively Blocked Diisocyanate 200 grams anhydrous polybutylene glycol (PTMG 1000) is added into 500-ml three-necked flask with an overhead stir, a thermometer and nitrogen protection. 134.4 grams hexamethylene diisocyanate (HDI) is then added into the flask to form a homogeneous solution with PTMG with 10-min's stirring, followed by addition of 240 μl of dibutyltindilaurate (DBTL) catalyst at 70° C. for 3 hours. After 3 hours, 255 grams of tertiary-butylaminoethyl methacrylate (TBAEMA) is gradually added. The temperature is then set at 50° C. with the addition of 100 ppm of benzene-1,4-diol. The reaction continues for 10 hours to produce product C in a clear liquid form, which is mixture of reactively blocked polyurethane prepolymer and the reactively blocked diisocyanate.

Example 4

Synthesis of Polyamine Protected with Carboxylic Acid 504.6 grams of 2-methylpentamethylenediamine is mixed with 295.4 grams of sebacic acid under nitrogen protection. The mixture is then heated to 245° C. gradually with the reaction temperature kept above 230° C. for about 10 hours. After evacuation to remove traces of moisture, the molten Product D is discharged and cooled under the nitrogen protection in a desiccator. Once cooled and solidified completely, the product resin is broken into pieces in medium size and then grounded into powder using a centrifugal pulverizer. After being sifted through a 250μ screen to remove coarse particles, the powder resin is then packaged under nitrogen protection for future use.

Example 5

DLP 3D Printing Test Using the Products from Examples 1, 2 and 4

At room temperature, polyethylene glycol (600) methacrylate, 1,4-butanediol diacrylate and photoinitiator TPO are mixed using a rotor mixer for 30 minutes at 500 rpm to obtain a clear liquid. Product A, B and D from Examples 1, 2 and 4, respectively are mixed into this clear liquid using the rotor mixer for 40 minutes at 1500 rpm until another clear liquid is obtained. Blue coloring agent is then added to this new clear liquid and mixed using the rotor mixer for 30 minutes at 2000 rpm to yield printing material for 3D printing. The viscosity of the printing material is tested as 4400 cps at the production and then becomes 4500 cps after storage at room temperature for 3 months. The viscosity only has a 2% increase over three months, demonstrating good stability. The specific amount of each reactants to produce the final printing material is listed in the following table. A test strip is obtained from the above-mentioned printing material using a From 1+ SLA printer with a laser power of 5 mW and a scan rate of 3 m/s. The test strip is then placed in an oven at 140° C. for 10 hours to complete thermal curing. A tensile test in accordance with the ASTM D412 standard shows a 36.7±1.3 MPa tensile strength and a 352±25% of elongation break.

| Component | Weight Percentage (wt %) |
| --- | --- |
| Product A from Example 1 | 45 |
| Product B from Example 2 | 15 |
| polyethylene glycol (600) methacrylate | 20 |
| 1,4-butanediol diacrylate | 9 |
| Product D from Example 4 | 10 |
| photoinitiator TPO | 0.5 |
| Blue coloring agent | 0.5 |

Example 6

Synthesis of MIBK Protected Curing Agent DMDC 3,3-Dimethyl-4,4-diaminodicyclohexylmethane (DMDC) and methyl isobutyl ketone (MIBK) in an excess amount (molar ratio of 1:4) are placed in a reactor and stirred at an elevated temperature in an oil bath. The reaction temperature is first raised to 130° C. in order to form a reflux reaction. After 2 hours of reaction at 130° C., the reflux reaction continues for about 4 hours at 150-160° C. After the completion of the reaction, the product mixture is purified by vacuum distillation at 120° C. for 2-3 hours in order to remove product water and excess methyl isobutyl ketone to obtain a pale, yellow and transparent liquid E with a yield ratio of about 95%. The reaction scheme is illustrated in the following:

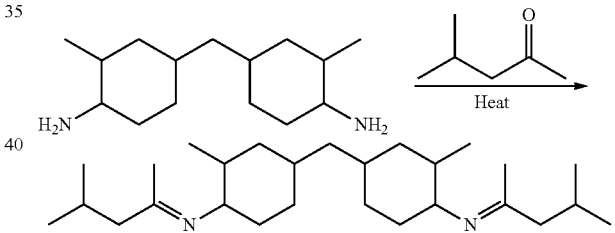

Example 7

DLP 3D Printing Test Using the Products from Examples 3 and 6

A solution is obtained by dissolving photoinitiator TPO into 1,6-hexanediol dimethacrylate and polyethylene glycol (600) dimethacrylate (PEG(600) DMA). Product C from Example 3 and MIBK-protected ketoimine curing agent from Example 6 are added into the above solution and mixed together to obtain a uniform printing material. A dog-bone shaped test strip is then prepared from the above-mentioned printing material using LEAP™ printing technology. After the printing, the test strip is first cleaned and then left for 12 hours in an environment of 25° C. and 65% humidity. The test strip is then placed in an oven at 120° C. for 8 hours to complete thermal curing. A mechanical property test is conducted using a CTM tensile machine. A tensile test in accordance with the ASTM D412 standard shows a 20 MPa tensile strength and a 310% of elongation break.

| Component | Parts by Weight |
|---|---|
| Product C from Example 3 | 70 |
| PEG(600)DMA | 10 |
| 1,6-hexanediol dimethacrylate | 20 |
| Product E from Example 6 | 11.15 |
| TPO | 1.0 |

Example 8

Synthesis of Boc$_2$O Protected Curing Agent PACM 120 grams of water and 9.14 g (0.0435 mol) of 4,4-diaminodicycyclohexyl methane (PACM) are added into a 205 ml one-neck flask and stirred for 20 minutes. 20.9 grams (0.0957 mol) of di-tert-butyl decarbonate (Boc2O) is then added to react at room temperature (30-35° C.). In the beginning of the reaction, the reactants in the flask first turn into a white emulsion and a small amount of bubbles appear on the inner wall of the flask. After 3 hours of reaction a large amount of white precipitate appears, indicating that the reaction is almost complete. The reaction product is then filtered using a reduced-pressure funnel to remove the aqueous phase. The filtered solid phase is washed three times with 200 ml of distilled water and then filtered to obtain white and solid material. This material is dried under vacuum at 90° C. for 4 h to yield a white powdery solid Product F with a yield ratio of about 50%. The reaction scheme is illustrated in the following:

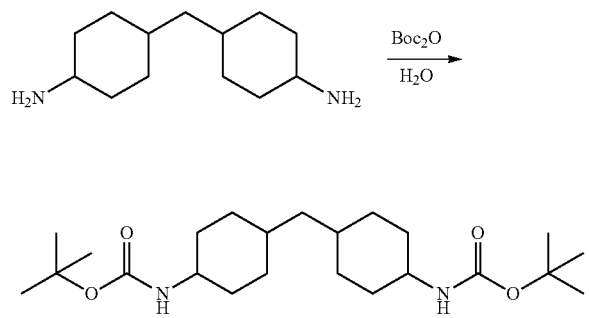

Example 9

DLP 3D Printing Test Using the Products from Example 3 and Example 8

A solution is obtained by dissolving photoinitiator TPO into lauryl methacrylate (LMA) and polyethylene glycol (600) dimethacrylate (PEG(600) DMA). Product C from Example 3 and Boc$_2$O-protected curing agent from Example 8 are added into the above solution and mixed to obtain a uniform printing material. A dog-bone shaped test strip is then prepared from the above-mentioned printing material using LEAP™ printing technology. After the printing, the test strip is first cleaned and then placed in an oven at 120° C. for 8 hours to complete thermal curing. A mechanical property test in accordance with the ASTM D412 standard is conducted using a CTM tensile machine. The specific amount of each reactants to produce the final printing material are listed in the following tables. A tensile test in accordance with the ASTM D412 standard shows a 18 MPa tensile strength and a 280% of elongation break.

| Component | Parts by Weight |
|---|---|
| Product C from Example 3 | 75 |
| PEG(600)DMA | 10 |
| LMA | 15 |
| Product F from Example 8 | 12.19 |
| TPO | 0.8 |

Example 10

DLP 3D Printing Test Using Products from Example 3 and methylenedianiline·NaCl Curing Agent At room temperature, polyethylene glycol (600) acrylate, 2-ethylhexyl acrylate, methylenedianiline-NaCl and photoinitiator TPO-L are mixed using a rotor mixer for 30 minutes at 500 rpm to obtain a clear liquid. Product C from Examples 3 is mixed into this clear liquid and using the rotor mixer for 40 minutes at 1500 rpm until another clear liquid is obtained. Red coloring agent is then added to this new clear liquid and mixed using the rotor mixer for 30 minutes at 2000 rpm to yield printing material for 3D printing. The viscosity of the printing material is tested as 3400 cps and then becomes 3700 cps after storage at room temperature for 3 months, which is only a 8% increase, demonstrating good stability. The specific amount of each reactants to produce the final printing material is listed in the following table. A test strip is obtained from the above-mentioned printing material using a From 1+ SLA printer with a laser power of 3.5 mW and a scan rate of 3.5 m/s. The test strip is then placed in an oven at 140° C. for 10 hours to complete thermal curing. A tensile test in accordance with the ASTM D412 standard shows a 25.3±2.7 MPa tensile strength and a 452±15% of elongation break.

| Component | Weight Percentage (wt %) |
|---|---|
| Product C from Example 3 | 70 |
| polyethylene glycol (600) acrylate | 20 |
| 2-ethylhexyl acrylate | 4 |
| methylenedianiline•NaCl | 5 |
| Photoinitiator TPO-L | 0.7 |
| Red coloring agent | 0.3 |

Example 11

Synthesis of Photopolymerizable Ketone Protected Curing Agent 3,3-Dimethyl-4,4-diaminodicyclohexylmethane (DMDC) and 3,3-dimethyl-4-oxopentyl methacrylate in an excess amount (molar ratio of 1:2) is placed in a reactor and stirred at an elevated temperature in an oil bath. The reflux reaction continues for about 8 hours at 150-160° C. After the completion of the reaction, the product mixture is purified by vacuum distillation at 120° C. for 2-3 hours in order to remove product water and excess 3,3-dimethyl-4-oxopentyl methacrylate to obtain a pale, yellow and transparent liquid H with a yield ratio of about 85%. The reaction scheme is illustrated in the following:

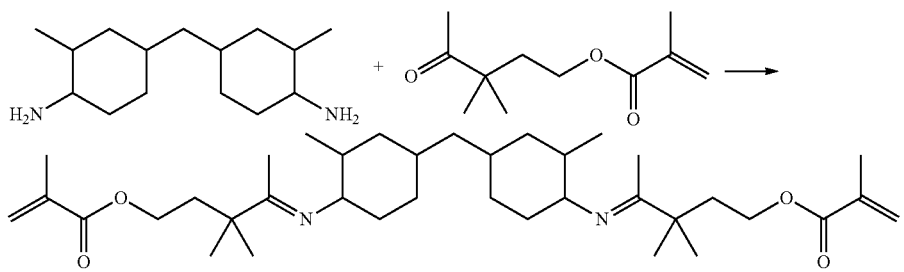

Example 12

DLP 3D Printing Test Using Products from Example 3 and Example 11

At room temperature, polyethylene glycol (600) methacrylate, 1,6-hexanediol diacrylate and photoinitiator 819 are mixed using a rotor mixer for 30 minutes at 500 rpm to obtain a clear liquid. Product C and F from Examples 3 and 11, respectively are mixed into this clear liquid using the rotor mixer for 40 minutes at 1500 rpm until a clear liquid printing material for 3D printing is ready. The viscosity of the printing material is tested as 3500 cps at the production and then becomes 3800 cps after storage at room temperature for 3 months. The viscosity only has a 8% increase over three months, demonstrating good stability. The specific amount of each reactants to produce the final printing material is listed in the following table. A test strip is obtained from the above-mentioned printing material using a From 1+ SLA printer with a laser power of 8 mW and a scan rate of 2.5 m/s. The test strip is then placed in an oven at 120° C. for 15 hours to complete thermal curing. A tensile test in accordance with the ASTM D412 standard shows a 22.2±3.3 MPa tensile strength and a 283±12% of elongation break.

| Component | Weight Percentage (wt %) |
| --- | --- |
| Product C from Example 3 | 63.6 |
| Product H from Example 11 | 15.4 |
| polyethylene glycol (600) methacrylate | 12 |
| 1,6-hexanediol diacrylate | 8 |
| photoinitiator 819 | 1.0 |

Example 13

Synthesis of Photopolymerizable Boc2O Protected Curing Agent PACM 120 grams of water and 9.14 g (0.0435 mol) of 4,4-diaminodicycyclohexyl methane (PACM) is added into a flask and stirred for 20 minutes. 30.5 grams ((oxybis(carbonyl))bis(oxy))bis(2-methylpropane-2,1-diyl) bis(2-methylacrylate) is then added to react at room temperature (30-35° C.). In the beginning of the reaction, the reactants in the flask first turns into a white emulsion and a small amount of bubbles appear on the inner wall of the flask. After 5 hours of reaction a large amount of white precipitate appears, indicating that the reaction is almost complete. The reaction product is then filtered using a reduced-pressure funnel to remove the aqueous phase. The filtered solid phase is washed three times with 200 ml of distilled water and filtered to obtain white and solid material. This material is dried under vacuum at 90° C. for 4 h to yield a white powdery solid product G with a yield ratio of about 60%. The reaction scheme is illustrated in the following:

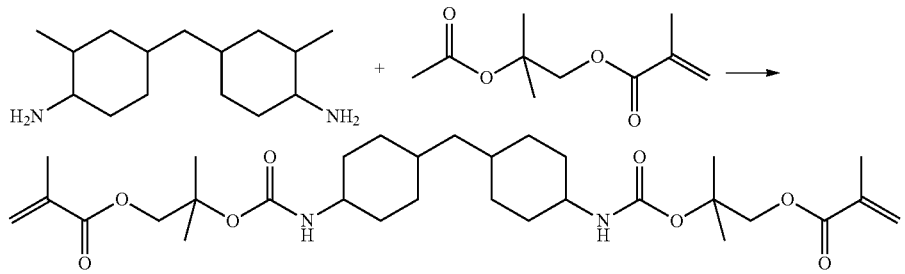

Example 14

DLP 3D Printing Test Using Products from Example 1 and Example 13

At room temperature, isobornyl methacrylate, 2-ethylhexyl acrylate, Product G from Example 13 and photoinitiator TPO are mixed using a rotor mixer for 30 minutes at 500 rpm to obtain a clear liquid. Product A from Example 1 is then mixed into this clear liquid using the rotor mixer for 30 minutes at 2000 rpm until a clear liquid printing material for 3D printing is ready. The viscosity of the printing material is tested as 2200 cps at the production and then becomes 2400 cps after storage at room temperature for 3 months. The viscosity only has a 9% increase over three months, demonstrating good stability. The specific amount of each reactants to produce the final printing material is listed in the following table. A test strip is obtained from the above-mentioned printing material using a From 1+ SLA printer with a laser power of 3.5 mW and a scan rate of 3.5 m/s. The test strip is then placed in an oven at 140° C. for 10 hours to complete thermal curing. A tensile test in accordance with the ASTM D412 standard shows a 55.3±2.7 MPa tensile strength and a 102±11% of elongation break.

| Component | Weight Percentage (wt %) |
|---|---|
| Product A from Example 1 | 50 |
| Product G from Example 13 | 16.2 |
| isobornyl methacrylate | 20 |
| 2-ethylhexyl acrylate | 13.1 |
| photoinitiator TPO | 0.7 |

Example 15

Synthesis of 2-methyl, 4-oxopentyl ester-Blocked DMDC 3,3-Dimethyl-4,4-diaminodicyclohexylmethane (DMDC) and 2-methyl, 4-oxopentyl ester in an excess amount (molar ratio of 1:2) is placed in a reactor and stirred at an elevated temperature in an oil bath. The reflux reaction continues for about 8 hours at 150-160° C. After the completion of the reaction, the product mixture is purified by vacuum distillation at 120° C. for 2-3 hours in order to remove product water and excess 2-methyl, 4-oxopentyl ester to obtain a pale, yellow and transparent liquid I with a yield ratio of about 85%. The reaction scheme is illustrated in the following:

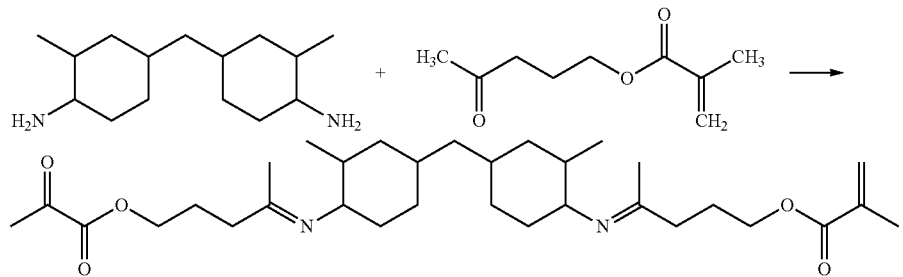

Example 16

DLP 3D Printing Test Using the Products from Example 15

A solution is obtained by dissolving photoinitiator TPO, light stabilizer 292, antioxidant 1135 into lauryl methacrylate (LMA) and polyethylene glycol (600) dimethacrylate (PEG(600) DMA) using Thinky™ mixer. TBAEMA-blocked polyurethane prepolymer (TBAEMA-IPDI-PTMO2000-IPDI-TBAEMA and Product I from Example 15 are added into the above solution and mixed together to obtain a uniform printing material using Thinky™ mixer. A dog-bone shaped test strip is then prepared from the above-mentioned printing material using LEAP™ printing technology. After the printing, the test strip is first cleaned and then placed in water at 60° C. for 30 min, and then in an oven at 120° C. for 8 hours to complete thermal curing. A mechanical property test in accordance with the ASTM D412 standard is conducted using a CTM tensile machine. The specific amount of each reactants to produce the final printing material and the tested mechanical properties are listed in the following tables:

| | Parts by Weight | | |
|---|---|---|---|
| | Test sample #1 | Test sample #2 | Test sample #3 |
| TBAEMA-IPDI-PTMO2000-IPDI-TBAEMA | 70 | 70 | 70 |
| PEG(600)DMA | 25 | 10 | 15 |
| LMA | 5 | 20 | 15 |
| Product I from Example 15 | 15 | 20 | 15 |
| TPO | 0.5 | 0.5 | 0.5 |
| 1135 | 1 | 1 | 1 |
| 292 | 0.7 | 0.7 | 0.7 |
| Mechanical Property | | | |
| Tensile Strength (MPa) | 22 | 20 | 16 |
| Elongation Break (%) | 240 | 270 | 260 |

Example 17

Synthesis of a Protecting Ketone to Protect Polyamine

In a three-necked flask equipped with a stirrer, a condenser and a thermometer, 1 mol of methacrylate polymerization inhibitor (0.1%-0.3% by mass), 3-6 mol of solvent, and a ketone containing chlorine group, such as,

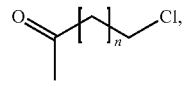

where n=3, are added, stirred well and heated to react. The reaction temperature is controlled between 80-120° C. After 4-8 hours, when the reaction is completed, NaCl is filtered to obtain filtrate. Then the filtrate is distilled under reduced pressure at 30-60° C. to distill off any unreacted materials and solvents and then rectified at 80-130° C. to obtain a colorless and transparent product. In this example, the methacrylate polymerization inhibitor may be hindered phenols, aromatic amines, or quinones, etc. The solvent may be benzene (such as benzene, toluene, etc.), alkanes (such as cyclohexane, n-heptane, petroleum ether, etc.) The phase transfer catalyst may be benzyltriethylammonium chloride (TEBA).

Example 18

Synthesis of Another Protecting Ketone to Protect Polyamine 1.1-3.5 mol of alcohol containing carbonyl group, such as

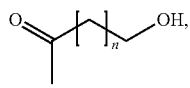

where n=3, 1 mol of methacrylic acid, 8-10 mol of dichloromethane as the solvent, 0.03-0.1 mol of DMAP (4-dimethylaminopyridine) as the phase transfer catalyst are added into the reactor and stirred well. Temperature is reduced to 0-20° C. and DCC (dicyclohexylcarbodiimide) is added to react. The reaction temperature is controlled under 40° C. for 4-10 hours. After the reaction is completed, the product is filtered to remove the insoluble dicyclohexyl urea and the filtrate is then washed and separated with 1 mol/L hydrochloric acid. The oil phase is separated and washed with saturated sodium bicarbonate. The oil phase is again separated and the solvent is distilled off under reduced pressure to obtain yellow colored crude product. The crude product is than distilled under reduced pressure again to obtain a colorless transparent product.

Example 19

Synthesis of Curing Agent with a Crosslinking Curing Site 1 mol of diethylenetriamine (DETA), 1-3 mol of methyl isobutyl ketone are added into reactor and stirred well together solvent, such as benzene, toluene, xylene, or alkane for azeotropic reaction. After the water in the water trap reaches the predetermined amount, the solvent used and the access ketone are removed under reduced temperature and pressure condition to obtain diethyltriamine ketimine. 100-500 ppm of polymerization inhibitor and 1 mol of glycidyl methacrylate (GMA) are then added to the product to produce the Product J under 60-100° C. condition. The reaction scheme is illustrated in the following:

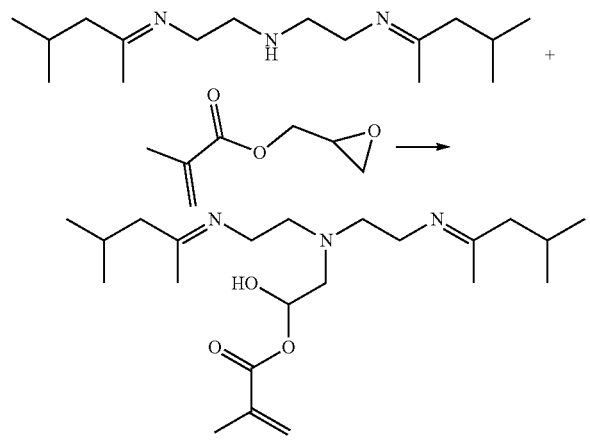

Example 20

DLP 3D Printing Test Using the Product from Example 19

A solution is obtained by dissolving photoinitiator TPO, light stabilizer 292, antioxidant 1135 into lauryl methacrylate (LMA) and polyethylene glycol (600) dimethacrylate (PEG(600) DMA) using Thinky™ mixer. TBAEMA-blocked polyurethane prepolymer (TBAEMA-IPDI-PTMO2000-IPDI-TBAEMA and Product J from Example 19 is added into the above solution and mixed together to obtain a uniform printing material using Thinky™ mixer. A dog-bone shaped test strip is then prepared from the above-mentioned printing material using LEAP™ printing technology. After the printing, the test strip is first cleaned and then placed in water at 60° C. for 30 min, and then in an oven at 120° C. for 8 hours to complete thermal curing. A tensile test in accordance with the ASTM D412 standard shows a 22 MPa tensile strength and a 340% of elongation break.

| Component | Parts by Weight |
|---|---|
| TBAEMA-IPDI-PTMO2000-IPDI-TBAEMA | 75 |
| PEG(600)DMA | 5 |
| LMA | 20 |
| Product J from Example 19 | 10.17 |
| light stabilizer 292 | 0.7 |
| antioxidant 1135 | 1 |
| photoinitiator TPO | 0.5 |

Example 21

Synthesis of Curing Agent with Asymmetrical Protecting Groups 1 mol of 3,3-Dimethyl-4,4-diaminodicyclohexylmethane (DMDC), 1 mol of methyl isobutyl ketone (MIBK) are added into reactor and stirred well together solvent, such as benzene, toluene, xylene, or alkane for azeotropic reaction. After the water in the water trap reaches the predetermined amount, DMDC with MIBK protecting only on one end is obtained. 1 mol Product from Example 17 is added to the for continuous azeotropic reaction. After the water produced reaches the predetermined amount, the excess solvent is removed through reduced pressure distillation to obtain Product K.

Example 22

DLP 3D Printing Test Using the Product from Example 21

A solution is obtained by dissolving photoinitiator TPO, light stabilizer 292, antioxidant 1135 into lauryl methacrylate (LMA) and polyethylene glycol (600) dimethacrylate (PEG(600) DMA) using Thinky™ mixer. TBAEMA-blocked polyurethane prepolymer (TBAEMA-IPDI-PTMO2000-IPDI-TBAEMA and Product K from Example 21 is added into the above solution and mixed together to obtain a uniform printing material using Thinky™ mixer. A dog-bone shaped test strip is then prepared from the above-mentioned printing material using LEAP"" printing technology. After the printing, the test strip is first cleaned and then placed in water at 60° C. for 30 min, and then in an oven at 120° C. for 8 hours to complete thermal curing. A tensile test in accordance with the ASTM D412 standard shows a 28 MPa tensile strength and a 640% of elongation break.

| Component | Parts by Weight |
|---|---|
| TBAEMA-IPDI-PTMO2000-IPDI-TBAEMA | 75 |
| PEG(600)DMA | 5 |
| LMA | 20 |
| Product K from Example 21 | 14.01 |
| light stabilizer 292 | 0.7 |
| antioxidant 1135 | 1 |
| photoinitiator TPO | 0.5 |

What is claimed is:

1. A polymerizable liquid used for producing three-dimensional objects by methods of additive manufacturing, said polymerizable liquid comprising:
a blocked or reactively blocked polyurethane prepolymer;
a blocked or reactively blocked curing agent; and
a photoinitiator;
wherein said blocked or reactively blocked curing agent has a structure of Formula ($A_1$), Formula ($A_2$), Formula ($A_3$), Formula ($A_4$), Formula ($A_5$), or Formula ($A_6$):

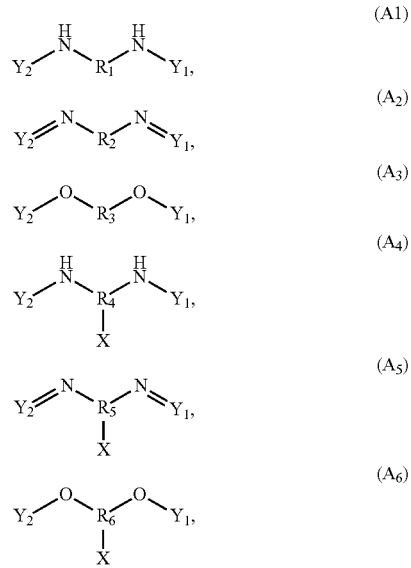

wherein each of $R_1$, $R_2$, and $R_3$ includes a linear or branched $C_1$-$C_{36}$ alkyl, a linear or branched $C_1$-$C_{36}$ alkylene, an alkenyl, an alkenylene, an aryl, an arylene, a heteroaryl, a heteroarylene, a cycloalkyl, or cycloalkenyl;
each of $R_4$, $R_5$ and $R_6$ includes an amino-dialkyl, a $C_3$-$C_{36}$ aryl, an arylene, a cycloalkyl, or a cycloalkenyl;
each of $Y_1$ and $Y_2$ includes a protecting group that protects amino groups or hydroxyl groups;
each of at least one of said $Y_1$ or said $Y_2$ of the Formula ($A_1$), the Formula ($A_2$), or the Formula ($A_3$) further comprises a photopolymerizable group; and
X comprises a photopolymerizable group.

2. The polymerizable liquid of claim 1, wherein said blocked or reactively blocked polyurethane prepolymer comprises a polyisocyanate.

3. The polymerizable liquid of claim 1, wherein said blocked or reactively blocked polyurethane prepolymer has a structure of Formula (A):

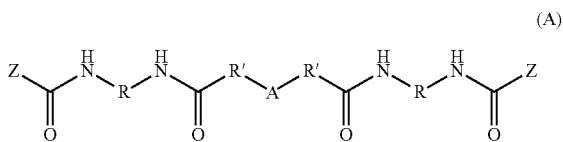

wherein A and R are hydrocarbyl groups, R' is NH or O, and Z is a blocking group having a reactive epoxy, an alkenyl, an alkynyl, or a thiol terminal group.

4. The polymerizable liquid of claim 3, wherein said Z is tert-butyl aminoethyl methacrylate (t-BAEMA).

5. The polymerizable liquid of claim 1, wherein said $Y_1$ and said $Y_2$ of the Formula ($A_1$), the Formula ($A_2$), or the Formula ($A_3$) have different structures.

6. The polymerizable liquid of claim 1, wherein said blocked or reactively blocked curing agent comprises an imine group, said imine group is a substituent derived from a reaction of an aldehyde or ketone with an amine.

7. The polymerizable liquid of claim 1, wherein said blocked or reactively blocked curing agent comprises a carbamate group, said carbamate group is a substituent derived from a reaction of a carboxylic acid or carboxylic ester with an amine.

8. The polymerizable liquid of claim 1, wherein said photopolymerizable group comprises an acrylate group or a methacrylate group.

9. The polymerizable liquid of claim 1, said polymerizable liquid further comprising:
a reactive diluent.

10. The polymerizable liquid of claim 1, said polymerizable liquid further comprising:
a blocked or reactively blocked diisocyanate.

11. A method for forming a three-dimensional object, comprising:
providing a printing region defined by a forming platform and a resin reservoir having a forming surface;
filling said printing region with a polymerizable liquid, said polymerizable liquid including a blocked or reactively blocked polyurethane prepolymer, a blocked or reactively blocked curing agent, and a photoinitiator;
exposing said printing region filled with the polymerizable liquid to energy to form a solid printing intermediate having substantially a same shape as said three-dimensional object;
providing energy to said solid printing intermediate to form said three-dimensional object;
wherein said blocked or reactively blocked curing agent has a structure of Formula ($A_1$), Formula ($A_2$), Formula ($A_3$), Formula ($A_4$), Formula ($A_5$), or Formula ($A_6$):

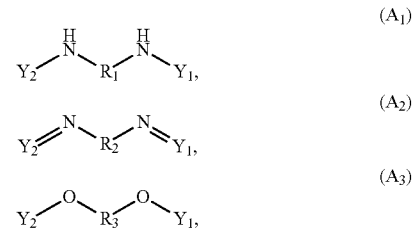

-continued

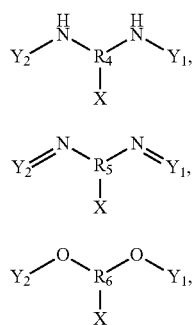

wherein each of $R_1$, $R_2$, and $R_3$ includes a linear or branched $C_1$-$C_{36}$ alkyl, a linear or branched $C_1$-$C_{36}$ alkylene, an alkenyl, an alkenylene, an aryl, an arylene, a heteroaryl, a heteroarylene, a cycloalkyl, or cycloalkenyl;

each of $R_4$, $R_5$ and $R_6$ includes an amino-dialkyl, a $C_3$-$C_{36}$ aryl, an arylene, a cycloalkyl, or a cycloalkenyl;

each of $Y_1$ and $Y_2$ includes a protecting group that protects amino groups or hydroxyl groups;

each of at least one of said $Y_1$ or said $Y_2$ of the Formula ($A_1$), the Formula ($A_2$), or the Formula ($A_3$) further comprises a photopolymerizable group; and X comprises a photopolymerizable group.

12. The method of claim 11, wherein said blocked or reactively blocked curing agent is contained in said solid printing intermediate in a cured form.

13. The method of claim 11, wherein said three-dimensional object comprises a polymer blend, an interpenetrating polymer network, a semi-interpenetrating polymer network, or a sequential interpenetrating polymer network of polyurethane and polyacrylate.

14. The method of claim 11, wherein said three-dimensional object comprises a copolymer of polyurethane and polyacrylate.

* * * * *